(12) United States Patent
Oh et al.

(10) Patent No.: US 9,523,885 B2
(45) Date of Patent: Dec. 20, 2016

(54) BACKLIGHT UNIT AND DISPLAY DEVICE HAVING BACKLIGHT UNIT

(71) Applicant: LG ELECTRONICS INC., Seoul (KR)

(72) Inventors: Sewon Oh, Seoul (KR); Eunseok Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/928,962

(22) Filed: Oct. 30, 2015

(65) Prior Publication Data

US 2016/0139463 A1     May 19, 2016

Related U.S. Application Data

(60) Provisional application No. 62/073,509, filed on Oct. 31, 2014.

(30) Foreign Application Priority Data

Jul. 31, 2015   (KR) .................. 10-2015-0109158

(51) Int. Cl.
    *G09F 13/04*     (2006.01)
    *G02F 1/1335*    (2006.01)
(52) U.S. Cl.
    CPC ... G02F 1/133605 (2013.01); G02F 1/133603 (2013.01); G02F 1/133611 (2013.01); *G02F 1/133606* (2013.01)

(58) Field of Classification Search
    CPC .................. G02F 1/133603; G02F 1/133605; G02F 1/133606; G02F 1/133608; G02F 1/133611; G02F 2001/133607
    See application file for complete search history.

(56) References Cited

U.S. PATENT DOCUMENTS

| | | |
|---|---|---|
| 7,658,504 B2 | 2/2010 | Moriyasu et al. |
| 8,651,685 B2 | 2/2014 | Roberts et al. |
| 2006/0044830 A1 | 3/2006 | Inoue et al. |
| 2006/0104080 A1 | 5/2006 | Kim et al. |
| 2007/0268721 A1* | 11/2007 | Jung ................ G02F 1/133604 362/609 |
| 2007/0297163 A1 | 12/2007 | Kim et al. |
| 2009/0067158 A1 | 3/2009 | Hamada |

(Continued)

FOREIGN PATENT DOCUMENTS

| | | |
|---|---|---|
| CN | 1794063 A | 6/2006 |
| CN | 1987599 A | 6/2007 |

(Continued)

*Primary Examiner* — Evan Dzierzynski
(74) *Attorney, Agent, or Firm* — Birch, Stewart, Kolasch & Birch, LLP

(57) ABSTRACT

A backlight unit is discussed, which includes a frame including a bottom and a sidewall extending from the bottom; at least one substrate located on the frame, and a plurality of light sources mounted on the at least one substrate; and a reflecting sheet located on the at least one substrate, wherein the reflecting sheet includes: a first sheet part located on the bottom, the first sheet part including a plurality of holes corresponding to the plurality of the light sources; a second sheet part extended from the first sheet part, the second sheet part including first areas and second areas; and a third sheet part extended from the second sheet part and located on the sidewall.

36 Claims, 26 Drawing Sheets

(56) References Cited

U.S. PATENT DOCUMENTS

| | | |
|---|---|---|
| 2009/0168396 A1* | 7/2009 | Moriyasu .......... H05B 33/0803 362/84 |
| 2009/0168399 A1 | 7/2009 | Kim et al. |
| 2009/0213296 A1 | 8/2009 | Park et al. |
| 2010/0124047 A1* | 5/2010 | Ahn .................. G02B 5/02 362/97.3 |
| 2010/0296270 A1 | 11/2010 | Gomi et al. |
| 2011/0013119 A1 | 1/2011 | Ha et al. |
| 2011/0050735 A1 | 3/2011 | Bae et al. |
| 2011/0109814 A1 | 5/2011 | Takemura |
| 2011/0304796 A1 | 12/2011 | Lee et al. |
| 2011/0305004 A1 | 12/2011 | Kim et al. |
| 2012/0069248 A1 | 3/2012 | Yokota |
| 2012/0106147 A1 | 5/2012 | Kim et al. |
| 2012/0170253 A1* | 7/2012 | Park ............ G02F 1/133608 362/97.1 |
| 2012/0206940 A1 | 8/2012 | Han et al. |
| 2012/0236204 A1 | 9/2012 | Kasai |
| 2012/0287347 A1 | 11/2012 | Matsumoto |
| 2012/0307160 A1* | 12/2012 | Yokota ............ G02F 1/133707 348/725 |
| 2013/0016524 A1 | 1/2013 | Momose et al. |
| 2013/0070170 A1 | 3/2013 | Namekata |
| 2013/0155676 A1 | 6/2013 | Lee |
| 2013/0188114 A1 | 7/2013 | Sugaya |
| 2013/0329401 A1 | 12/2013 | Yamamoto et al. |
| 2014/0184985 A1 | 7/2014 | Liu et al. |
| 2014/0204578 A1 | 7/2014 | Kim et al. |
| 2014/0211121 A1 | 7/2014 | Cho et al. |
| 2014/0253845 A1 | 9/2014 | Shibata |
| 2014/0307421 A1 | 10/2014 | Lee et al. |
| 2015/0146436 A1 | 5/2015 | Heo et al. |

FOREIGN PATENT DOCUMENTS

| | | |
|---|---|---|
| CN | 102466179 A | 5/2012 |
| CN | 103032777 A | 4/2013 |
| CN | 203643721 U | 6/2014 |
| EP | 2 426 395 A1 | 3/2012 |
| EP | 2 515 027 A1 | 10/2012 |
| EP | 2 762 957 A1 | 8/2014 |
| JP | 2009-266625 A | 11/2009 |
| JP | 2013-143217 A | 7/2013 |
| KR | 10-2008-0000144 A | 1/2008 |
| KR | 10-2013-0063773 A | 6/2013 |
| TW | 200403502 A | 3/2004 |
| TW | 200825552 A | 6/2008 |
| TW | 200907438 A | 2/2009 |

* cited by examiner (a)

(b)

BACKLIGHT UNIT AND DISPLAY DEVICE HAVING BACKLIGHT UNIT

This application claims the benefit of U.S. Provisional Application No. 62/073,509 filed on Oct. 31, 2014, and the priority benefit of Korean Patent Application No. 10-2015-0109158 filed in the Korean Intellectual Property Office on Jul. 31, 2015, the entire contents of which are incorporated herein by reference for all purposes as if fully set forth herein.

BACKGROUND OF THE INVENTION

Field of the Invention

The present disclosure relates to a backlight unit and a display device comprising it.

Discussion of the Related Art

With the development of the information society, various demands for display devices have been increasing. Various display devices, such as liquid crystal displays (LCDs), plasma display panels (PDPs), electroluminescent displays (ELDs), and vacuum fluorescent displays (VFDs), have been recently studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

SUMMARY OF THE INVENTION

The present disclosure provides a backlight unit including a reflecting sheet having a dot area.

In one aspect, there is a backlight unit including a frame including a bottom and a sidewall extending from the bottom; at least one substrate located on the frame, and a plurality of light sources mounted on the at least one substrate; and a reflecting sheet located on the at least one substrate, wherein the reflecting sheet includes: a first sheet part located on the bottom, the first sheet part including a plurality of holes corresponding to the plurality of the light sources; a second sheet part extended from the first sheet part, the second sheet part including first areas and second areas; and a third sheet part extended from the second sheet part and located on the sidewall, wherein the first areas correspond to outermost holes among the plurality of holes, and the second areas are located between the first areas, wherein a dot pattern in the first areas is different from a dot pattern in the second areas, wherein the dot pattern in at least one of the first areas and the second areas includes a plurality of dot areas positioned sequentially in a direction from the first sheet part to the third sheet part, the plurality of dot areas including first dot areas and second dot areas, the first dot areas including a plurality of dots having the same size and the second dot areas including a plurality of dots having the same size, and wherein a size of the plurality of dots in the first dot areas is different from a size of the plurality of dots in the second dot areas.

At least one of the first dot areas and the second dot areas protrudes toward the first sheet part.

The first dot areas protrudes toward the first sheet part.

The first dot areas protrudes toward the first sheet part excluding one first dot area adjacent to a corner of the reflecting sheet.

The first dot areas have the same first dot pattern, and the second dot areas have the same second dot pattern different from the first dot pattern.

The pluralities of dots of the first dot areas and the second dot areas are positioned on a horizontal dot area formed along a first side of the reflecting sheet and a vertical dot area formed along a second side of the reflecting sheet, and a first distance between a point nearest to the third sheet part in the horizontal dot area and a hole nearest to the horizontal dot area among the plurality of holes is different from a second distance between a point nearest to the third sheet part in the vertical dot area and a hole nearest to the vertical dot area.

The pluralities of dots of the first dot areas and the second dot areas are positioned on a horizontal dot area formed along a first side of the reflecting sheet and a vertical dot area formed along a second side of the reflecting sheet, and a third distance between a point nearest to the first sheet part in the horizontal dot area and a hole nearest to the horizontal dot area among the plurality of holes is different from a fourth distance between a point nearest to the first sheet part in the vertical dot area and a hole nearest to the vertical dot area.

The pluralities of dots of the first dot areas and the second dot areas are positioned on a horizontal dot area formed along a first side of the reflecting sheet and a vertical dot area formed along a second side of the reflecting sheet, and a fifth distance between a point nearest to the first sheet part and a point nearest to the third sheet part in the horizontal dot area is different from a sixth distance between a point nearest to the first sheet part and a point nearest to the third sheet part in the vertical dot area.

A size of a dot of the first dot areas nearest to the first sheet part is different from a size of a dot of the second dot areas nearest to the first sheet part.

In the second sheet part, at least one of a size and a density of the pluralities of dots of the first dot areas and the second dot areas increases as the pluralities of dots approach the third sheet part.

In the second sheet part, at least one of a size and a density of the pluralities of dots of the first dot areas and the second dot areas increases as the pluralities dots approach the third sheet part along an imaginary line connecting a first point of a corner area of the reflecting sheet and a second point closest to the third sheet part in the middle of the second sheet part.

In the second sheet part, at least one of a size and a density of dots of a first area adjacent to the third sheet part is different from at least one of a size and a density of dots of a second area except the first area.

The first area is one of the first dot areas, and at least one of a size and a density of at least one dot of the first area is smaller than at least one of a size and a density of at least one dot of the second dot areas.

The pluralities of dots of the first dot areas and the second dot areas are positioned on a horizontal dot area formed along a first side of the reflecting sheet and a vertical dot area formed along a second side of the reflecting sheet, and at least one of the horizontal and vertical dot areas has different widths, the widths being in a direction from the first sheet part to the third sheet part.

At least one of the horizontal and vertical dot areas includes a center area and side areas positioned on the sides of the center area, and a width of the center area is smaller than widths of the side areas.

A dot pattern of the center area is different from a dot pattern of the side areas.

At least one protrusion area protruding from the side areas to the first sheet part.

At least one of a size and a density of at least one dot of the at least one protrusion area is different from at least one of a size and a density of at least one dot adjacent to the at least one protrusion area.

A width of at least a portion of the at least one horizontal dot area is different from a width of at least another portion of the at least one horizontal dot area.

Each of the first areas corresponds to each of the outermost holes among the plurality of holes.

In another aspect, there is a backlight unit including: a frame including a bottom and a sidewall extending from the bottom; at least one substrate located on the frame, and a plurality of light sources mounted on the at least one substrate; and a reflecting sheet located on the at least one substrate, wherein the reflecting sheet includes: a first sheet part located on the bottom, the first sheet part including a plurality of holes corresponding to the plurality of the light sources; a second sheet part extended from the first sheet, the second sheet part including first areas and second areas; and a third sheet part extended from the second sheet and located on the sidewall, wherein the first areas correspond to outermost holes among the plurality of holes, and the second areas are located between the first areas, wherein a dot pattern in the first areas is different from a dot pattern in the second areas, wherein the dot pattern in at least one of the first areas and the second areas includes a plurality of dot areas positioned sequentially in a direction from the first sheet part to the third sheet part, the plurality of dot areas including first dot areas and second dot areas, the first dot areas including a plurality of dots having the same size and the second dot areas including a plurality of dots having the same size, and wherein a distance of adjacent dots in the first dot areas is different from a distance of adjacent dots in the second dot areas.

In another aspect, there is a display device including: a frame including a bottom and a sidewall extending from the bottom; at least one substrate located on the frame, and a plurality of light sources mounted on the at least one substrate; a reflecting sheet located on the at least one substrate, an optical sheet located on the reflecting sheet; and a display panel located on the optical sheet, wherein the reflecting sheet includes: a first sheet part located on the bottom, the first sheet part including a plurality of holes corresponding to the plurality of the light sources; a second sheet part extended from the first sheet, the second sheet part including first areas and second areas; and a third sheet part extended from the second sheet and located on the sidewall, wherein the first areas correspond to outermost holes among the plurality of holes, and the second areas are located between the first areas, wherein a dot pattern in the first areas is different from a dot pattern in the second areas, wherein the dot pattern in at least one of the first areas and the second areas includes a plurality of dot areas positioned sequentially in a direction from the first sheet part to the third sheet part, the plurality of dot areas including first dot areas and second dot areas, the first dot areas including a plurality of dots having the same size and the second dot areas including a plurality of dots having the same size, and wherein a size of the plurality of dots in the first dot areas is different from a size of the plurality of dots in the second dot areas.

Each of the first areas may be corresponding to each of outermost holes among the plurality of holes.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
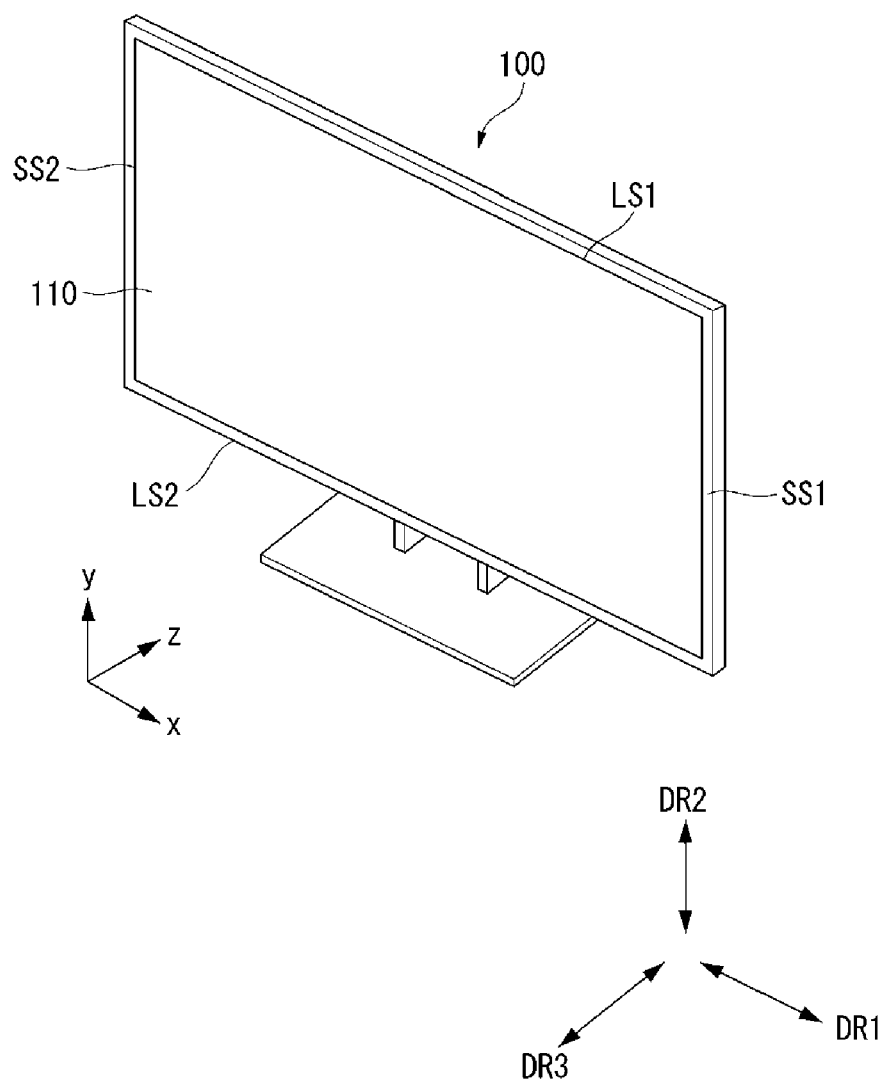
FIGS. 1 and 2 illustrate a display device according to an example embodiment of the invention.

Reference will now be made in detail to embodiments of the invention, examples of which are illustrated in the accompanying drawings. Wherever possible, the same reference numbers will be used throughout the drawings to refer to the same or like parts. A suffix such as "module" and "unit"" may be assigned or used interchangeably to refer to elements or components. Use of such a suffix herein is merely intended to facilitate the description of the embodiments of the invention, and the suffix itself is not intended to give any special meaning or function. It will be paid attention that detailed description of known arts will be omitted if it is determined that the description of the known arts can obscure the embodiments of the invention. The accompanying drawings are merely intended to easily describe the embodiments of the invention, and the spirit and technical scope of the present invention is not limited by the accompanying drawings. It should be understood that the present invention is not limited to specific disclosed embodiments, but includes all modifications, equivalents and substitutes included within the spirit and technical scope of the present invention.

Hereinafter, the embodiments of the invention are described using a liquid crystal display panel as an example of a display panel. Other display panels may be used. For example, a plasma display panel (PDP), a field emission display (FED) panel, and an organic light emitting diode (OLED) display panel may be used.

In what follows, a display panel may include a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

The embodiment of the invention describes that lengths of the first and second long sides LS1 and LS2 are longer than lengths of the first and second short sides SS1 and SS2 for the sake of brevity and ease of reading. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display panel, and a second direction DR2 may be a direction parallel to the short sides SS1 and SS2 of the display panel.

Further, a third direction DR3 may be a direction vertical to the first direction DR1 and/or the second direction DR2.

In the embodiment disclosed herein, the first direction DR1 and the second direction DR2 may be commonly referred to as a horizontal direction.

Further, the third direction DR3 may be referred to as a vertical direction.

Figure 2:
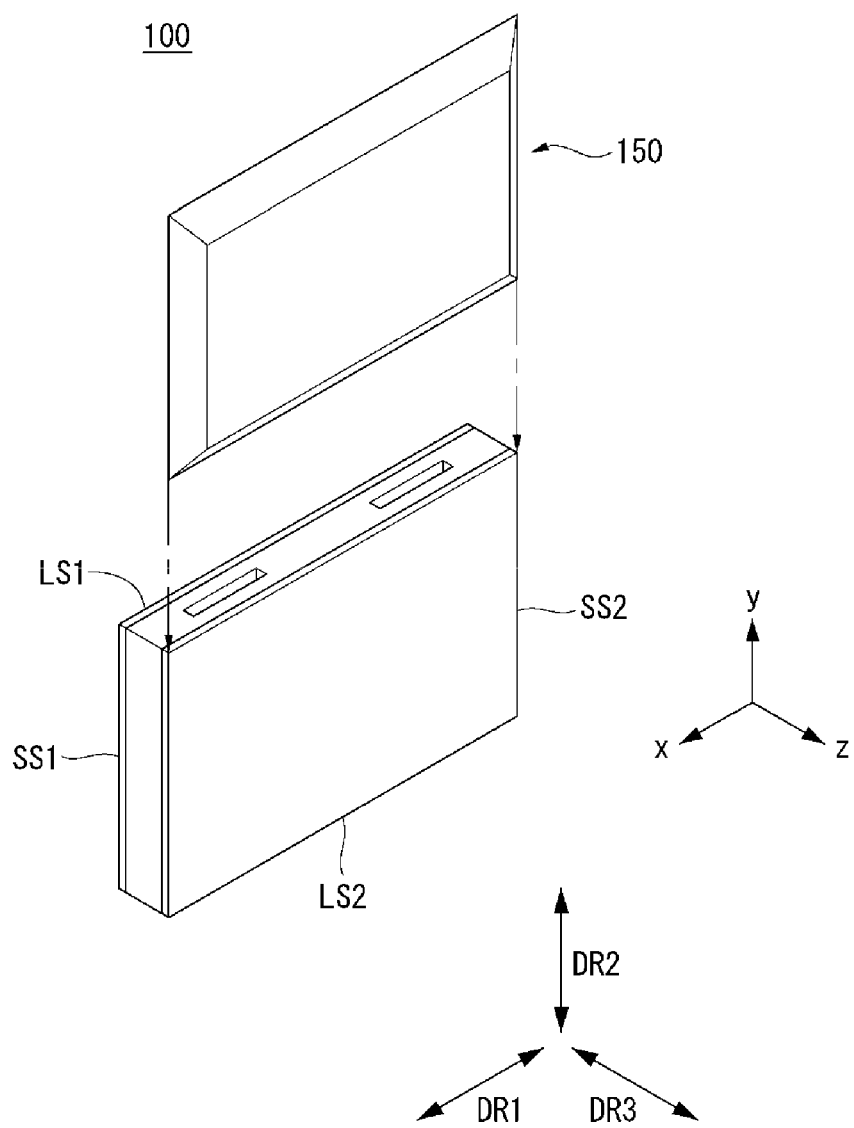

FIGS. 1 and 2 illustrate a display device according to an example embodiment of the invention.

As shown in FIGS. 1 and 2, a display device 100 according to the embodiment of the invention may include a display panel 110 and a back cover 150 positioned in the rear of the display panel 110.

The back cover 150 may be connected to the display panel 110 in a sliding manner in a direction (i.e., the second direction DR2) from the first long side LS1 to the second long side LS2. In other words, the back cover 150 may be inserted into the first short side SS1, the second short side SS2 opposite the first short side SS1, and the first long side LS1 which is adjacent to the first and second short sides SS1 and SS2 and is positioned between the first short side SS1 and the second short side SS2, of the display panel 110 in the sliding manner.

The back cover 150 and/or other components adjacent to the back cover 150 may include a protrusion, a sliding unit, a connection unit, etc., so that the back cover 150 is connected to the display panel 110 in the sliding manner.

Figure 3:
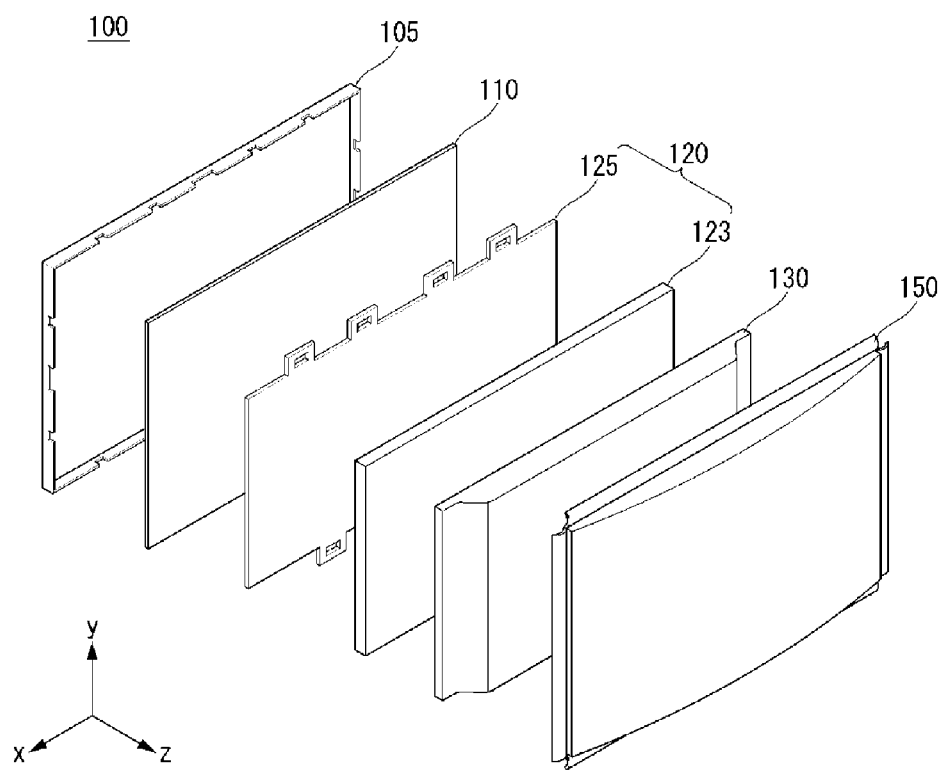
FIGS. 3 to 7 illustrate configuration of a display device related to an example embodiment of the invention.

FIGS. 3 to 7 illustrate configuration of a display device related to the embodiment of the invention As shown in FIG. 3, the display device 100 according to the embodiment of the invention may include a front cover 105, the display panel 110, a backlight unit 120, a frame 130, and the back cover 150.

The front cover 105 may cover at least a portion of a front surface and a side surface of the display panel 110. The front cover 105 may have a rectangular fame shape, in which a center portion is empty. Because the center portion of the front cover 105 is empty, an image displayed on the display panel 110 may be seen to the outside.

The front cover 105 may include a front cover and a side cover. Namely, the front cover 105 may include the front cover positioned at the front surface of the display panel 110 and the side cover at the side surface of the display panel 110. The front cover and the side cover may be separately configured. One of the front cover and the side cover may be omitted. For example, the front cover may be omitted, and only the side cover may be absent in terms of a beautiful appearance of the display device 100.

The display panel 110 may be positioned in front of the display device 100 and may display an image. The display panel 110 may divide the image into a plurality of pixels and may output the image while controlling color, brightness, and chroma of each pixel. The display panel 110 may include an active area, on which the image is displayed, and an inactive area, on which the image is not displayed. The display panel 110 may include a front substrate and a back substrate which are positioned opposite each other with a liquid crystal layer interposed therebetween.

The front substrate may include a plurality of pixels each including red, green, and blue subpixels. The front substrate may generate an image corresponding to the red, green, or blue color in response to a control signal.

The back substrate may include switching elements. The back substrate may turn on pixel electrodes. For example, the pixel electrode may change a molecule arrangement of the liquid crystal layer in response to a control signal received from the outside. The liquid crystal layer may include a plurality of liquid crystal molecules. The arrangement of the liquid crystal molecules may change depending on a voltage difference between the pixel electrode and a common electrode. The liquid crystal layer may transmit light provided by the backlight unit 120 to the front substrate.

The backlight unit 120 may be positioned at a back surface of the display panel 110. The backlight unit 120 may include a plurality of light sources. The light sources of the backlight unit 120 may be arranged in an edge type or a direct type. In an instance of the edge type backlight unit 120, a light guide plate may be added.

The backlight unit 120 may be coupled to a front surface of the frame 130. For example, the plurality of light sources may be disposed at the front surface of the frame 130. In this instance, the backlight unit 120 may be commonly called the direct type backlight unit 120.

The backlight unit 120 may be driven in an entire driving method or a partial driving method such as a local dimming method and an impulsive driving method. The backlight unit 120 may include an optical sheet 125 and an optical layer 123.

The optical sheet 125 can cause light of the light sources to be uniformly transferred to the display panel 110. The optical sheet 125 may include a plurality of layers. For example, the optical sheet 125 may include at least one prism sheet and/or at least one diffusion sheet.

The optical sheet 125 may further include at least one coupling unit 125d. The coupling unit 125d may be coupled to the front cover 105 and/or the back cover 150. Namely, the coupling unit 125d may be directly coupled to the front cover 105 and/or the back cover 150. Alternatively, the coupling unit 125d may be coupled to a structure formed on the front cover 105 and/or the back cover 150. Namely, the coupling unit 125d may be indirectly coupled to the front cover 105 and/or the back cover 150.

The optical layer 123 may include the light source, etc. The detailed configuration of the optical layer 123 will be described in the corresponding paragraphs.

The frame 130 may support components constituting the display device 100. For example, the frame 130 may be coupled to the backlight unit 120. The frame 130 may be formed of a metal material, for example, an aluminum alloy.

The back cover 150 may be positioned at a back surface of the display device 100. The back cover 150 may protect inner configuration of the display device 100 from the outside. At least a portion of the back cover 150 may be coupled to the frame 130 and/or the front cover 105. The back cover 150 may be an injection production (or injection molded) formed of a resin material.

Figure 4:
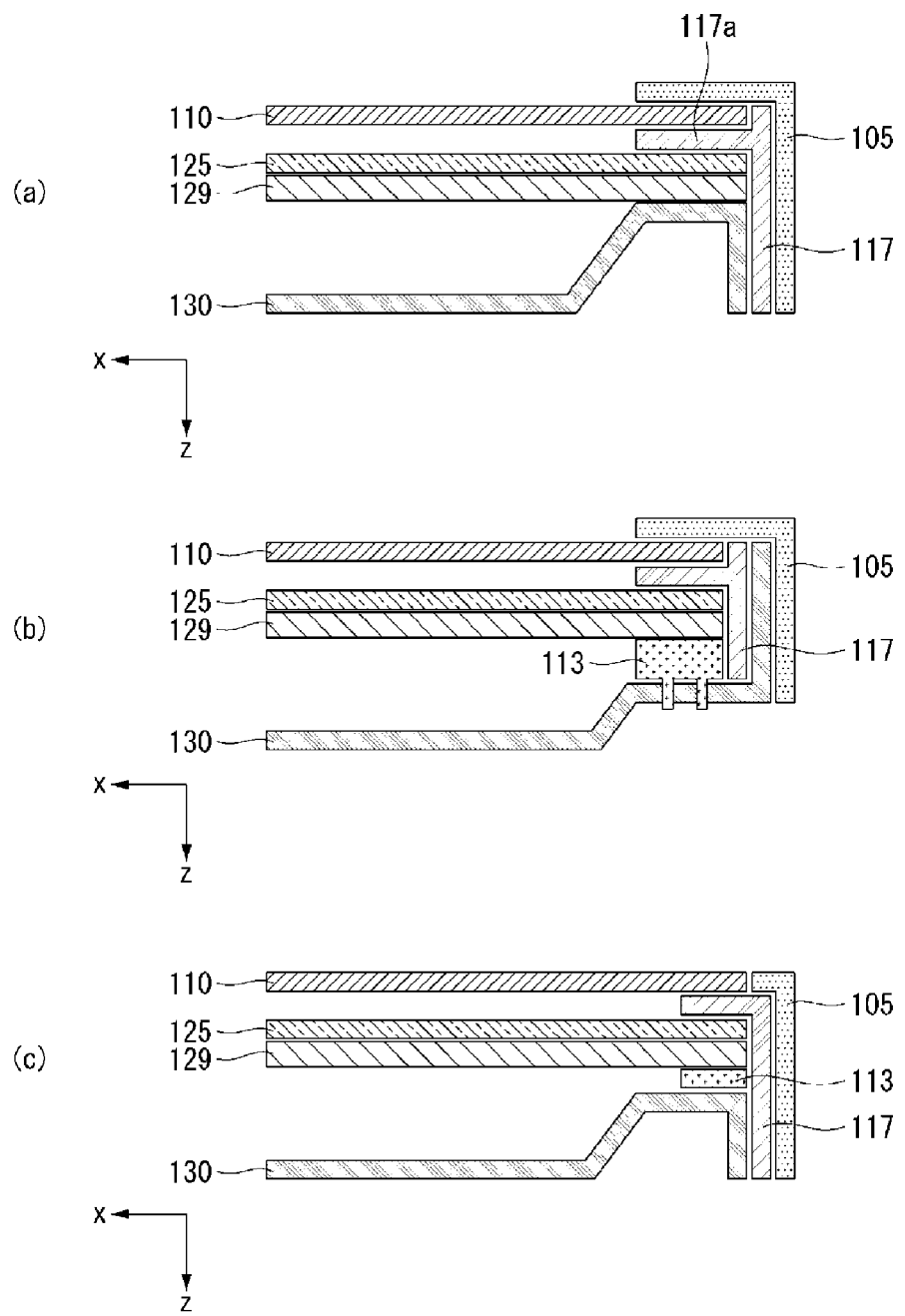

FIG. 4 shows the configuration of the optical sheet 125.

As shown in (a) of FIG. 4, the optical sheet 125 and/or a diffusion plate 129 may be positioned on the frame 130. The optical sheet 125 and/or the diffusion plate 129 may be coupled to the frame 130 at an edge of the frame 130. The optical sheet 125 and/or the diffusion plate 129 may be directly placed at the edge of the frame 130. Namely, an outer perimeter of the optical sheet 125 and/or the diffusion plate 129 may be supported by the frame 130. An upper surface of an edge of the optical sheet 125 and/or the diffusion plate 129 may be surrounded by a first guide panel 117. For example, the optical sheet 125 and/or the diffusion plate 129 may be positioned between the edge of the frame 130 and a flange 117a of the first guide panel 117.

The display panel 110 may be positioned at a front surface of the optical sheet 125. An edge of the display panel 110 may be coupled to the first guide panel 117. Namely, the display panel 110 may be supported by the first guide panel 117.

An edge area of the front surface of the display panel 110 may be surrounded by the front cover 105. For example, the display panel 110 may be positioned between the first guide panel 117 and the front cover 105.

As shown in (b) of FIG. 4, the display device 100 according to the embodiment of the invention may further include a second guide panel 113. The optical sheet 125 and/or the diffusion plate 129 may be coupled to the second guide panel 113. Namely, the second guide panel 113 may have a shape, in which the second guide panel 113 is coupled to the frame 130 and the optical sheet 125 and/or the diffusion plate 129 are/is coupled to the second guide panel 113. The second guide panel 113 may be formed of a material different from the frame 130. The frame 130 may have a shape surrounding the first and second guide panels 117 and 113.

As shown in (c) of FIG. 4, in the display device 100 according to the embodiment of the invention, the front cover 105 may not cover the front surface of the display panel 110. Namely, one end of the front cover 105 may be positioned on the side of the display panel 110.

Figure 5:
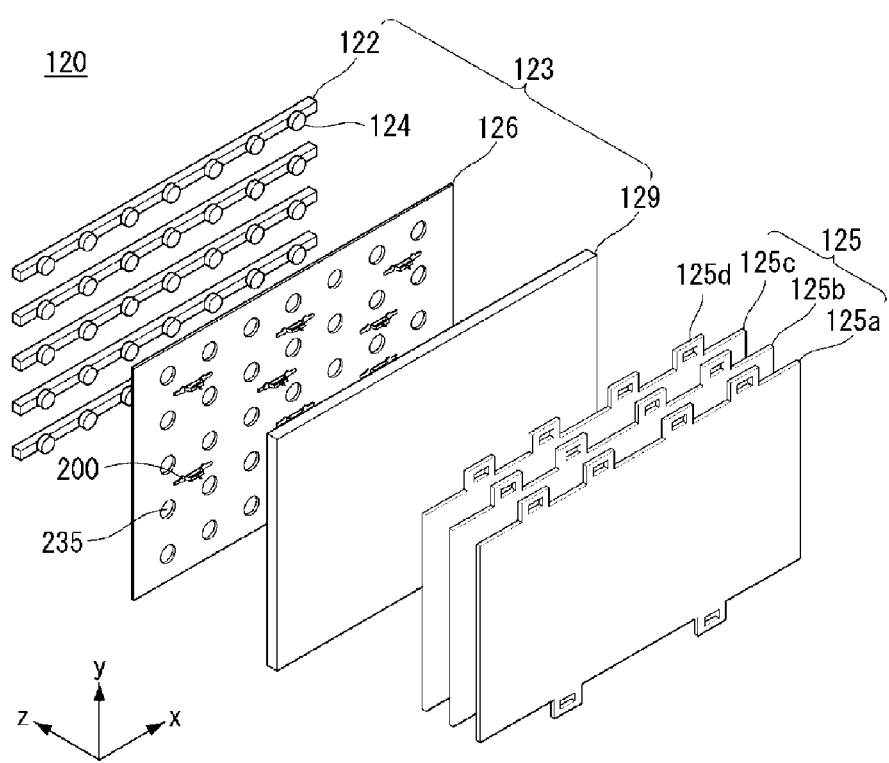
Figure 6:
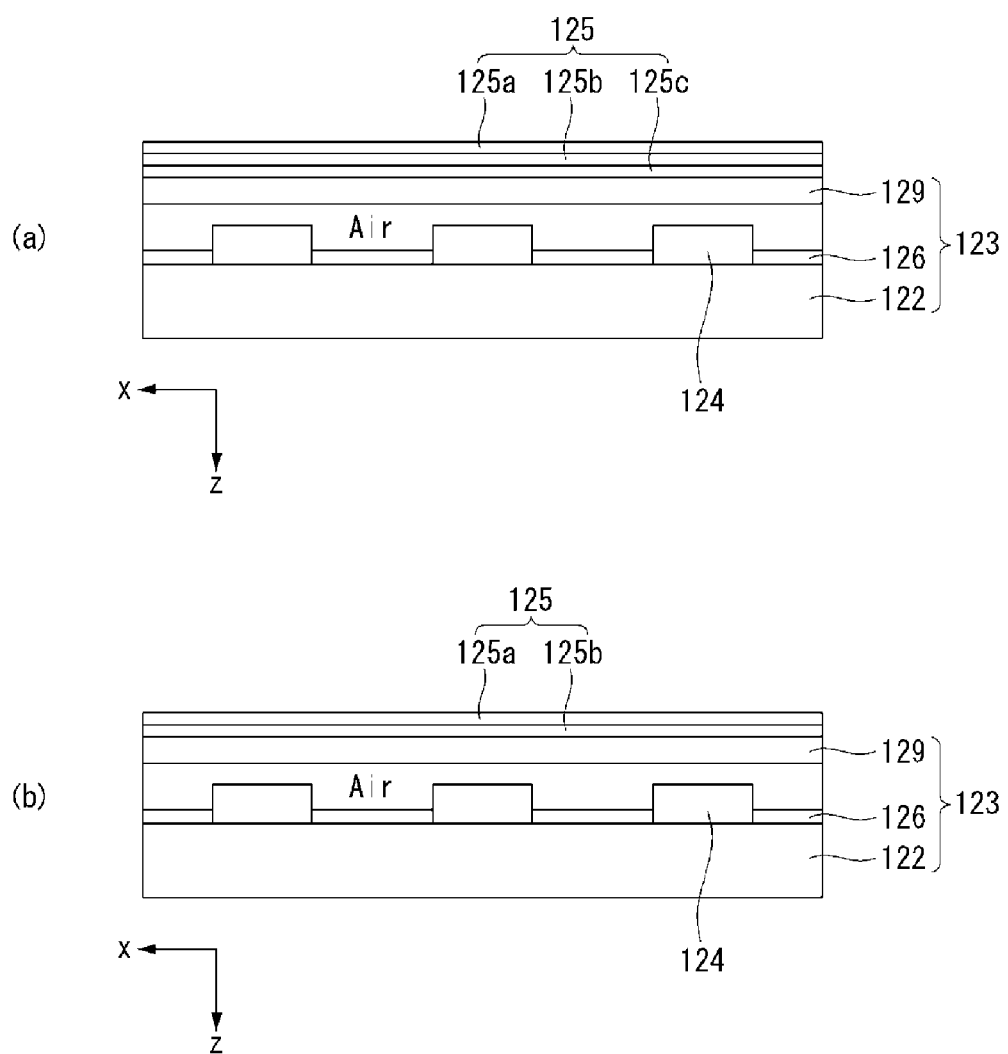

Referring to FIGS. 5 and 6, the backlight unit 120 may include the optical layer 123 including substrates 122, at least one light assembly 124, a reflecting sheet 126 and the diffusion plate 129, and the optical sheet 125 positioned on a front surface of the optical layer 123.

The substrates 122 may include a plurality of straps, which extend in a first direction and are separated from one another by a predetermined distance in a second direction perpendicular to the first direction.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 may be formed of at least one of polyethylene terephthalate (PET), glass, polycarbonate (PC), and silicon. The substrate 122 may be a printed circuit board (PCB), on which at least one light assembly 124 is mounted.

The light assemblies 124 may be disposed on the substrate 122 at predetermined intervals in the first direction. A diameter of the light assembly 124 may be greater than a width of the substrate 122. Namely, the diameter of the light assembly 124 may be greater than a length of the substrate 122 in the second direction.

The light assembly 124 may be one of a light emitting diode (LED) chip and a LED package having at least one LED chip.

The light assembly 124 may be configured as a colored LED emitting at least one of red, green, and blue light or a white LED. The colored LED may include at least one of a red LED, a green LED, and a blue LED.

The light source included in the light assembly 124 may be a COB (Chip-On-Board) type. The COB light source may have a configuration, in which the LED chip as the light source is directly coupled to the substrate 122. Thus, the process may be simplified. Further, a resistance may be reduced, and a loss of energy resulting from heat may be reduced. Namely, power efficiency of the light assembly 124 may increase. The COB light source can provide the brighter lighting and may be implemented to be thinner and lighter than a related art.

The reflecting sheet 126 may be positioned at the front surface of the substrate 122. The reflecting sheet 126 may be positioned in an area excluding a formation area of the light assemblies 124 of the substrates 122. Namely, the reflecting sheet 126 may have a plurality of holes 235.

The reflecting sheet 126 may reflect light emitted from the light assembly 124 to a front surface of the reflecting sheet 126. Further, the reflecting sheet 126 may again reflect light reflected from the diffusion plate 129.

The reflecting sheet 126 may include at least one of metal and metal oxide which are a reflection material. The reflecting sheet 126 may include metal and/or metal oxide having a high reflectance, for example, aluminum (Al), silver (Ag), gold (Au), and titanium dioxide ($TiO_2$).

The reflecting sheet 126 may be formed by depositing and/or coating the metal or the metal oxide on the substrate 122. An ink including the metal material may be printed on the reflecting sheet 126. On the reflecting sheet 126, a deposition layer may be formed using a heat deposition method, an evaporation method, or a vacuum deposition method such as a sputtering method. On the reflecting sheet 126, a coating layer and/or a printing layer may be formed using a printing method, a gravure coating method or a silk screen method.

An air gap may be positioned between the reflecting sheet 126 and the diffusion plate 129. The air gap may serve as a buffer capable of widely spreading light emitted from the light assembly 124. A supporter 200 may be positioned between the reflecting sheet 126 and the diffusion plate 129, so as to maintain the air gap.

A resin may be deposited on the light assembly 124 and/or the reflecting sheet 126. The resin may function to diffuse light emitted from the light assembly 124.

The diffusion plate 129 may upwardly diffuse light emitted from the light assembly 124.

The optical sheet 125 may be positioned at a front surface of the diffusion plate 129. A back surface of the optical sheet 125 may be adhered to the diffusion plate 129, and a front surface of the optical sheet 125 may be adhered to the back surface of the display panel 110.

The optical sheet 125 may include at least one sheet. More specifically, the optical sheet 125 may include one or more prism sheets and/or one or more diffusion sheets. The plurality of sheets included in the optical sheet 125 may be attached and/or adhered to one another.

In other words, the optical sheet 125 may include a plurality of sheets having different functions. For example, the optical sheet 125 may include first to third optical sheets 125a to 125c. The first optical sheets 125a may function as a diffusion sheet, and the second and third optical sheets 125b and 125c may function as a prism sheet. A number and/or a position of the diffusion sheets and the prism sheets may be changed. For example, the optical sheet 125 may include the first optical sheets 125a as the diffusion sheet and the second optical sheet 125b as the prism sheet.

The diffusion sheet may prevent light coming from the diffusion plate from being partially concentrated and may homogenize a luminance of the light. The prism sheet may concentrate light coming from the diffusion sheet and may make the concentrated light be vertically incident on the display panel 110.

The coupling unit 125d may be formed on at least one of corners of the optical sheet 125. The coupling unit 125d may be formed in at least one of the first to third optical sheets 125a to 125c.

The coupling unit 125d may be formed at the corner on the long side of the optical sheet 125. The coupling unit 125d formed on the first long side and the coupling unit 125d formed on the second long side may be asymmetric. For example, a number and/or a position of the coupling units 125d formed on the first long side may be different from a number and/or a position of the coupling units 125d formed on the second long side.

Figure 7:
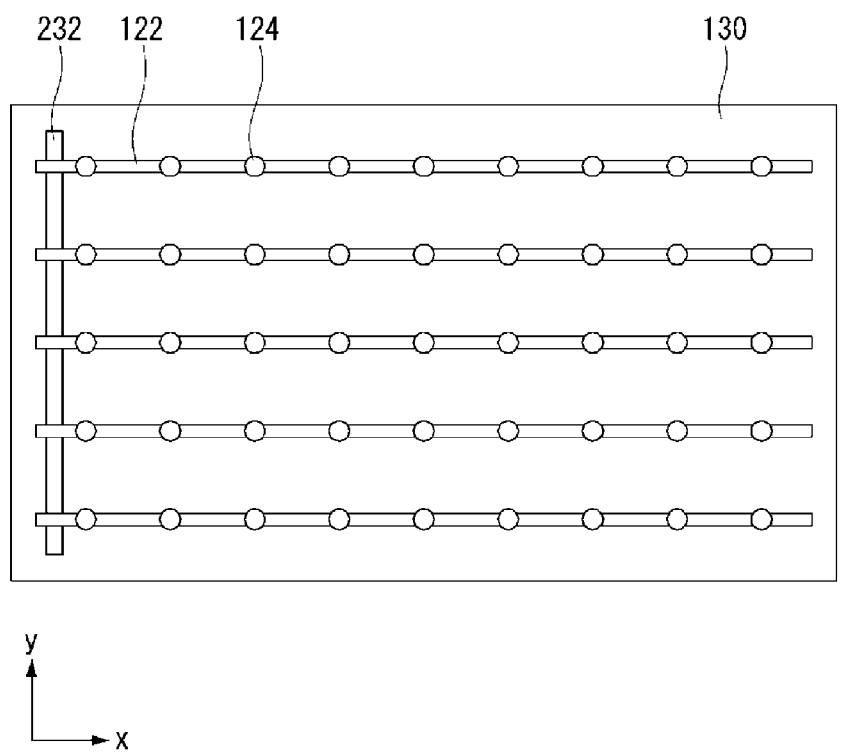

Referring to FIG. 7, the substrates 122 including the plurality of straps, which extend in the first direction and are separated from one another by a predetermined distance in the second direction perpendicular to the first direction, may be provided on the frame 130. One end of each of the plurality of substrates 122 may be connected to a line electrode 232.

The line electrode 232 may extend in the second direction. The line electrode 232 may be connected to the ends of the substrates 122 at predetermined intervals in the second direction. The substrates 122 may be electrically connected to the adaptor through the line electrode 232.

The light assemblies 124 may be mounted on the substrate 122 at predetermined intervals in the first direction. A diameter of the light assembly 124 may be greater than a width of the substrate 122 in the second direction. Hence, an outer area of the light assembly 124 may be positioned beyond a formation area of the substrate 122.

Figure 8:
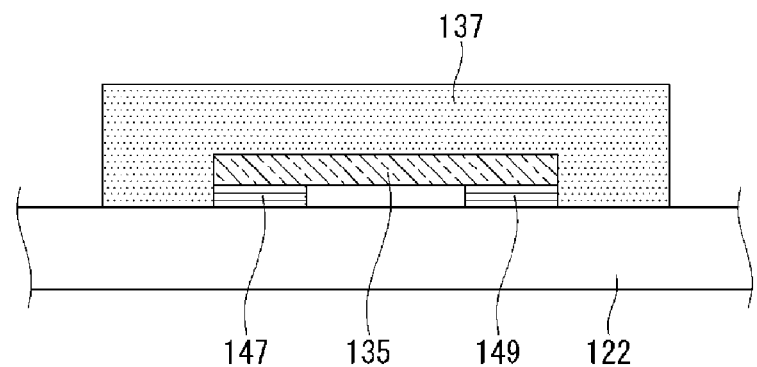
FIGS. 8 and 9 illustrate a light source according to an example embodiment of the invention.
Figure 9:
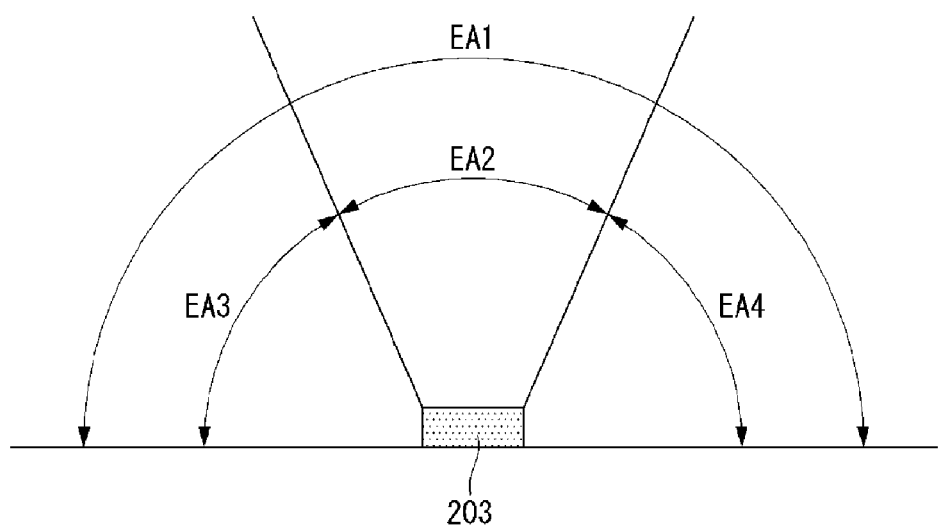

FIGS. 8 and 9 show a light source according to the embodiment of the invention.

As shown in FIG. 8, a light source 203 may be a COB light source. The COB light source 203 may include at least one of an emission layer 135, first and second electrodes 147 and 149, and a fluorescent layer 137.

The emission layer 135 may be positioned on the substrate 122. The emission layer 135 may emit one of red, green, and blue light. The emission layer 135 may include one of Firpic, (CF3ppy)2Ir(pic), 9,10-di(2-naphthyl)anthracene(AND), perylene, distyrybiphenyl, PVK, OXD-7, UGH-3(Blue), and a combination thereof.

The first and second electrodes 147 and 149 may be positioned on both sides of a lower surface of the emission layer 135. The first and second electrodes 147 and 149 may transmit an external driving signal to the emission layer 135.

The fluorescent layer 137 may cover the emission layer 135 and the first and second electrodes 147 and 149. The fluorescent layer 137 may include a fluorescent material converting light of a spectrum generated from the emission layer 135 into white light. A thickness of the emission layer 135 on the fluorescent layer 137 may be uniform. The fluorescent layer 137 may have a refractive index of 1.4 to 2.0.

The COB light source 203 according to the embodiment of the invention may be directly mounted on the substrate 122. Thus, the size of the light assembly 124 may decrease.

Because heat dissipation of the light sources 203 is excellent by forming the light sources 203 on the substrate 122, the light sources 203 may be driven at a high current. Hence, a number of light sources 203 required to secure the same light quantity may decrease.

Further, because the light sources 203 are mounted on the substrate 122, a wire bonding process may not be necessary. Hence, the manufacturing cost may be reduced due to the simplification of the manufacturing process.

As shown in FIG. 9, the light source 203 according to the embodiment of the invention may emit light in a first emission range EA1. Namely, the light source 203 may emit light in the first emission range EA1 including a second emission range EA2 of the front side and third and fourth emission ranges EA3 and EA4 of both sides. Thus, the light source 203 according to the embodiment of the invention is different from a related art POB light source emitting light in the second emission range EA2. In other words, the light source 203 according to the embodiment of the invention may be the COB light source, and the COB light source 203 may emit light in a wide emission range including the side.

Because the COD light source 203 emits light even in a direction corresponding to the third and fourth emission ranges EA3 and EA4 of the side, the embodiment of the invention needs to efficiently control light of the side direction. The reflecting sheet according to the embodiment of the invention may control a reflectance of light emitted from the light source 203 in the side direction. Thus, the embodiment of the invention may reduce the non-uniformity of brightness resulting from light of the side direction.

Figure 10:
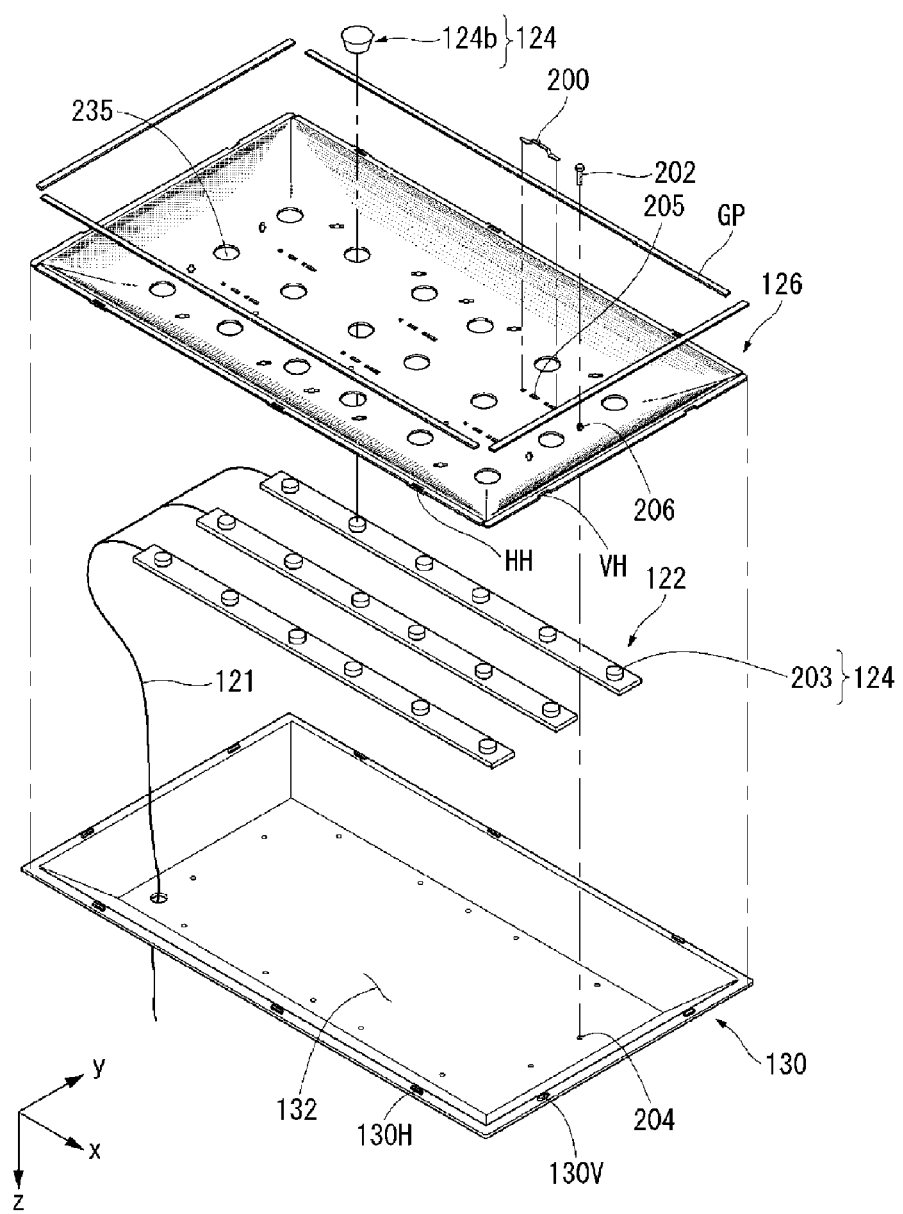
FIG. 10 illustrates a connection relationship between a reflecting sheet and components around the reflecting sheet according to an example embodiment of the invention.

FIG. 10 illustrates a connection relationship between the reflecting sheet and components around the reflecting sheet according to the embodiment of the invention.

As shown in FIG. 10, the reflecting sheet 126 according to the embodiment of the invention may be placed on the frame 130. For example, the reflecting sheet 126 may be coupled to a receiving unit 132 formed inside the frame 130.

The reflecting sheet 126 may include a horizontal coupling unit HH and a vertical coupling unit VH. For example, coupling holes may be formed along a long side and/or a short side of the reflecting sheet 126.

The horizontal coupling unit HH and the vertical coupling unit VH may be inserted into a horizontal protrusion 130H and/or a vertical protrusion 130V formed on the frame 130. A guide panel GP may be formed on the reflecting sheet 126.

The guide panel GP may be formed of plastic material of injection molding or press processed metal material. The guide panel GP may be coupled to the horizontal protrusion 130H and/or the vertical protrusion 130V. When the guide panel GP is coupled to the reflecting sheet 126, the reflecting sheet 126 may be fixed between the frame 30 and the guide panel GP. FIG. 10 shows that the long sides and the short sides of the guide panel GP are separated from one another, as an example. The guide panel GP, which the long sides and the short sides are connected to one another, may be used.

The reflecting sheet 126 placed on the frame 130 may be configured as a three-dimensional shape corresponding to a shape of the receiving unit 132. Even when the reflecting sheet 126 according to the embodiment of the invention has the three-dimensional shape, the reflecting sheet 126 can provide an optimum reflection effect. For example, the reflecting sheet 126 can uniformly reflect light throughout its entire area.

The reflecting sheet 126 may constitute a portion of the backlight unit 120 (refer to FIG. 5). The substrate 122, on which the light sources 203 are mounted, may be positioned between the reflecting sheet 126 and the frame 130.

The plurality of substrates 122 may be arranged in the horizontal direction and/or the vertical direction. The substrates 122 may be connected to signal lines 121 connected to a controller, etc., of the display device 100. The signal lines 121 may be connected to the substrates 122 through holes formed in the frame 130.

The reflecting sheet 126 may include a plurality of lens holes 235. The plurality of lens holes 235 may correspond to the light sources 203 on the substrate 122. For example, the plurality of lens holes 235 may be arranged in the horizontal direction and/or the vertical direction correspondingly to the light sources 203. A lens 124*b* may be inserted into the lens hole 235. For example, the lens 124*b* may be coupled to the light source 203 through the lens hole 235.

The reflecting sheet 126 may include a plurality of support holes 205. A supporter 200 may be coupled to the support hole 205. The supporter 200 may support the optical sheet 125 and/or the diffusion plate 129 positioned in front of the reflecting sheet 126. Namely, the reflecting sheet 126 may be separated from the optical sheet 125 and/or the diffusion plate 129 at a predetermined distance.

The reflecting sheet 126 may include a plurality of fixing pin holes 206. A fixing pin 202 may be coupled to the fixing pin hole 206. Also, the fixing pin 202 may be coupled to a frame hole 204 formed in the frame 130. Thus, the fixing pin 202 may fix the reflecting sheet 126 to the frame 130.

Figure 11:
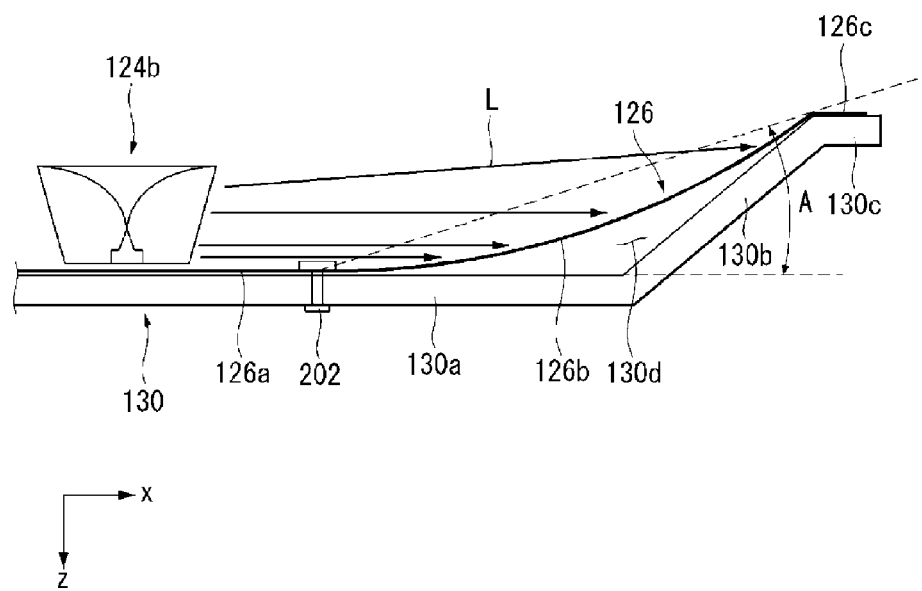
FIGS. 11 to 13 illustrate configuration of a reflecting sheet according to an example embodiment of the invention.
Figure 12:
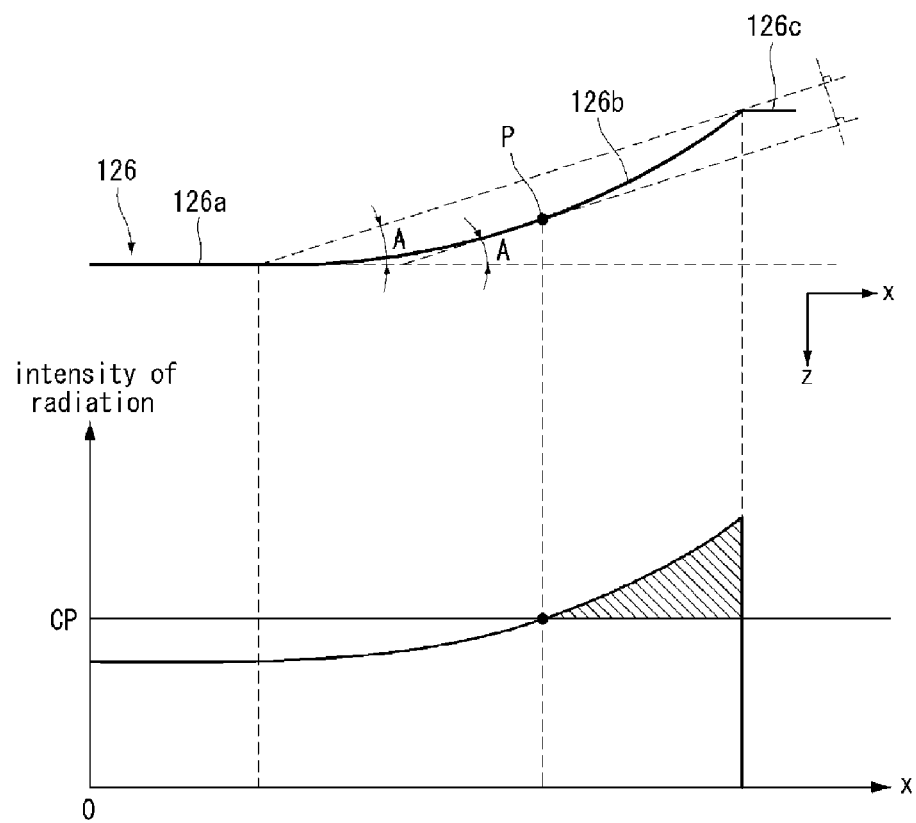
Figure 13:
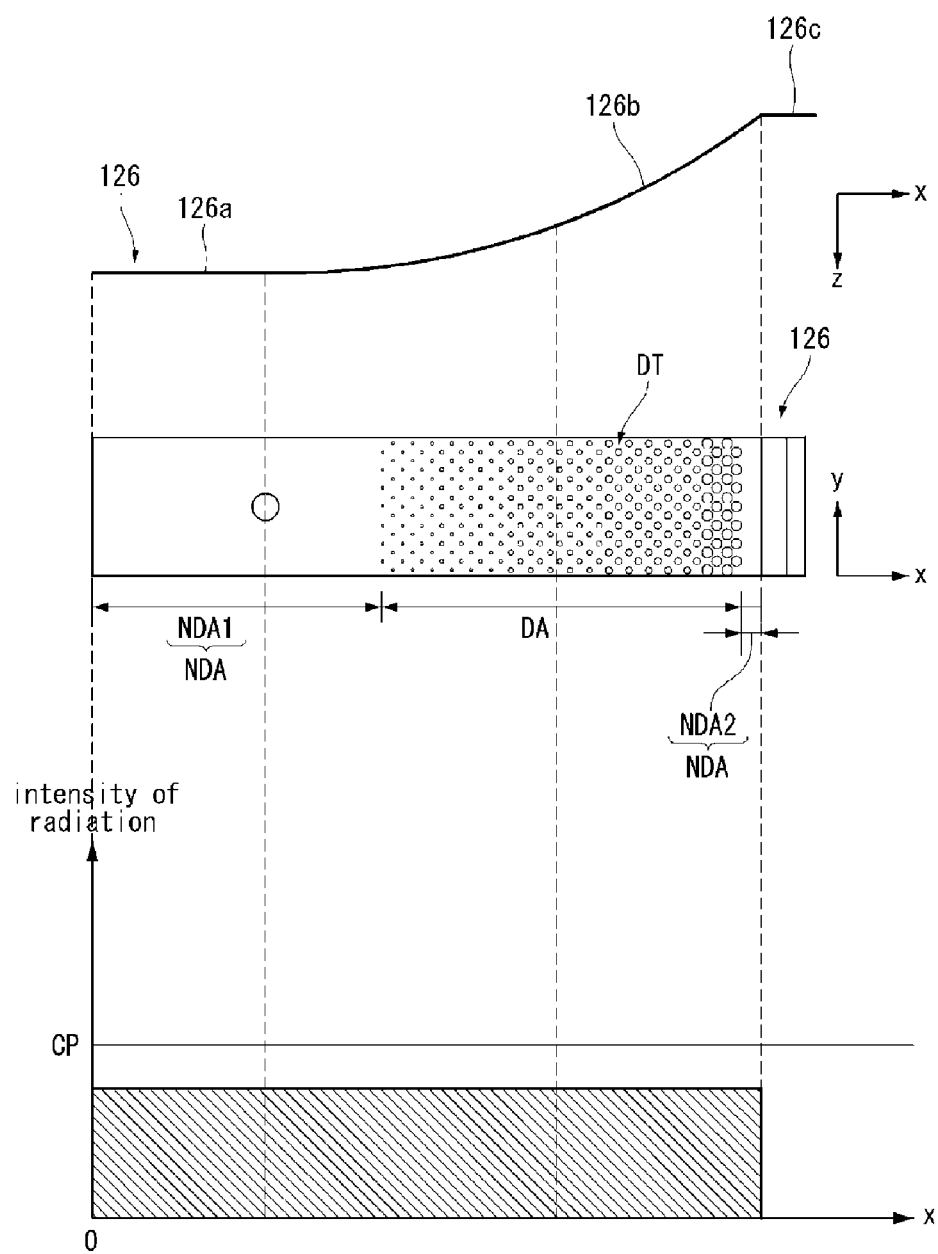

FIGS. 11 to 13 illustrate configuration of the reflecting sheet according to the embodiment of the invention.

As shown in FIGS. 11 to 13, the reflecting sheet 126 according to the embodiment of the invention may be placed in an inner area of the frame 130. The reflecting sheet 126 placed on the frame 130 may have the three-dimensional shape corresponding to a shape of the frame 130.

As shown in FIG. 11, the frame 130 may include first to third frame areas 130*a* to 130*c*.

The first frame area 130*a* may be a bottom surface of the frame 130. The second frame area 130*b* may be substantially flat. Namely, the second frame area 130*b* may be a surface positioned on an X-Y plane of the display device 100.

The second frame area 130*b* may be a sidewall surface extended upwardly from the first frame area 130*a*. The second frame area 130*b* may extend in a direction parallel to a Z-axis direction or a direction inclined to the Z-axis direction. The receiving unit 132 (refer to FIG. 10) may be formed inside the frame 130 by the second frame area 130*b* serving as a sidewall of the frame 130.

The third frame area 130*c* may be a surface extended from the second frame area 130*b* in an X-axis direction. The third frame area 130*c* may be substantially parallel to the first frame area 130*a*. Namely, the third frame area 130*c* may be a flat surface in the same manner as the first frame area 130*a* at a height level different from the first frame area 130*a* by the second frame area 130*b*.

The third frame area 130*c* may include a protruding area. The third frame area 130*c* may be coupled to a protrusion formed through a separate process. The protruding area and/or the protrusion of the third frame area 130*c* may be coupled to the reflecting sheet 126. For example, the protruding area and/or the protrusion of the third frame area 130*c* may be coupled to a third sheet area 126*c* of the reflecting sheet 126. The protruding area and/or the protrusion of the third frame area 130*c* may be coupled to the optical sheet 125 (refer to FIG. 5).

The reflecting sheet 126 may be coupled to an area formed by the first to third frame areas 130*a* to 130*c* of the frame 130. For example, the reflecting sheet 126 may be coupled to the first frame area 130*a* through the fixing pin 202. When a portion of the reflecting sheet 126 is coupled to the first frame area 130*a* through the fixing pin 202, the portion of the reflecting sheet 126 may naturally contact the frame 130.

When the reflecting sheet 126 is coupled to the frame 130 through the fixing pin 202, the shape of the reflecting sheet 126 may be naturally changed depending on the shape of the frame 130. Namely, a naturally rounded second sheet area 126*b* of the reflecting sheet 126 may be formed. Thus, a separate process for forming a chamfer of the reflecting sheet 126 may not be necessary, and workability may be improved.

The reflecting sheet 126 may include first to third sheet areas 126*a* to 126*c*. Namely, an area of the reflecting sheet 126 may be divided depending on whether or not the reflecting sheet 126 and the frame 130 contact each other. For example, the area of the reflecting sheet 126 may be divided into a contact area contacting the frame 130 and a non-contact area not contacting the frame 130.

The area of the reflecting sheet 126 may be divided into the first sheet area 126*a* and the second sheet area 126*b* by the fixing pin 202. In other words, the second sheet area 126*b* may be an area between the fixing pin 202 and a portion contacting the third frame area 130*c*, Namely, the first sheet area 126*a* and the second sheet area 126*b* may be determined depending on whether or not the reflecting sheet 126 contacts the first frame area 130*a* of the frame 130. The second sheet area 126*b* may be naturally separated from the frame 130 by properties and elasticity of the reflecting sheet 126. For example, when the first sheet area 126*a* is coupled to the frame 130 by the fixing pin 202, the second sheet area 126*b* may naturally form a curved surface by its own weight and may be separated from the frame 130. A separation space 130*d* may be formed between the second sheet area 126*b* and the frame 130. An angle formed by the second sheet area 126*b* of the reflecting sheet 126 and the bottom surface of the frame 130 may gradually increase. Namely, in the non-contact area of the reflecting sheet 126, the reflecting sheet 126 may have a two-dimensional curve shape. Thus, the second sheet area 126*b* may be separated from the frame 130 at a predetermined angle.

The third sheet area 126*c* may be placed in the third frame area 130*c*. The third sheet area 126*c* may be coupled to the third frame area 130*c*. Alternatively, the third sheet area 126*c* may be naturally positioned on the third frame area 130*c*. Namely, the third sheet area 126*c* may contact the third frame area 130*c* by elastic force of the Z-axis direction resulting from the rounded second sheet area 126*b*.

Light L may be emitted through the lens 124*b*. Namely, light generated in the light source 203 may be emitted to the outside through the lens 124*b*. The light L emitted through the lens 124*b* may travel through various paths. For example, a portion of the light L may travel through a path of the side direction of the lens 124*b*.

The portion of the light L in the path of the side direction may travel toward the second sheet area 126*b*. At least a portion of light generated in the light source 203 may be totally reflected inside the lens 124*b* and may travel toward the second sheet area 126*b*. In this instance, an amount of light L upwardly travelling in the second sheet area 126*b* may be more than an amount of light L downwardly travelling in the second sheet area 126b. In other words, an amount and/or a density of light L transferred to the reflecting sheet 126 may be non-uniform. When the amount and/or the density of the light L is not uniform, a viewer watching the display device 100 may perceive non-uniformity of the amount and/or the density of the light L. For example, when an amount of light L incident on an upper portion of the second sheet area 126b is more than an amount of light L incident on a lower portion of the second sheet area 126b, a corresponding area may be recognized as being brighter than other areas because of the light L reflected from the upper portion of the second sheet area 126b.

As shown in FIG. 12, an angle formed by an extension line from a boundary between the first sheet area 126a and the second sheet area 126b to a boundary between the second sheet area 126b and the third sheet area 126c and two straight lines parallel to the X-axis direction may be called "A". An inclined angle of the second sheet area 126b using an intersection point P between the second sheet area 126b and a straight line of the angle A as a starting point may increase. Namely, an angle of the second sheet area 126b passing the intersection point P in the X-axis direction may sharply increase.

Because the angle of the second sheet area 126b passing the intersection point increases, a density of the light L emitted from the lens 124b (refer to FIG. 11) per unit area may further increase. Thus, a corresponding portion may be seen as being brighter than other portions. As a result, the viewer may feel that the light is not uniform. The display device 100 according to the embodiment of the invention can make light be uniformly reflected from the reflecting sheet 126. Hence, the viewer cannot feel or can feel less the non-uniformity of the light.

As shown in FIG. 13, in the display device 100 according to the embodiment of the invention, dots DT may be formed in at least a portion of the reflecting sheet 126.

The dot DT may be an area having a pattern different from other areas. The dot DT may be an area of uneven portions (or concave-convex portions) formed on the reflecting sheet 126. The dot DT may be an area, in which at least a portion of the reflecting sheet 126 is colored. For example, the dot DT may be an area of a relatively dark color. For example, the dot DT may be a black or gray area. The dot DT may be an area, in which the uneven portion and the colored portion are mixed with each other. The dot DT may have a geometric shape, in which there is a difference in at least one of a shape, a size, a location, and a color. For example, the dot DT may be one of various shapes including a circle, an oval, a rectangle, a rod, a triangle, etc., formed on the reflecting sheet 126 and/or a combination of the various shapes.

The dots DT may affect a reflectance of a corresponding area. Namely, the dots DT may change a reflectance of light. For example, the reflectance of light may be reduced depending on at least one of a shape, a size, a location, and a color of the dot DT. The plurality of dots DT may gather (or arranged) and form a dot area DA.

The dot area DA may be a gathering (or arranging) of the dots DT. Namely, the dot area DA may be a formation area of the plurality of dots DT, which are the same as or different from one another in at least one of a shape, a size, a location, and a color. For example, the dot area DA may be formed in at least a portion of the second sheet area 126b. As described above, a density of light per unit area in the second sheet area 126b may be high because of the inclined shape of the second sheet area 126b. The dot area DA may change a reflectance of light incident on the second sheet area 126b. In other words, a density of incident light per unit area is high, but a density of reflected light per unit area may decrease. Thus, a phenomenon, in which a contrast of a portion corresponding to the second sheet area 126b is different from a contrast of other portions, may be prevented. Namely, light can be uniformly reflected from the entire reflecting sheet 126 because of the dot area DA. The dots DT constituting the dot area DA may be divided into a plurality of groups having different attributes. For example, a formation area of dots having a first attribute may be called a first area, and a formation area of dots having a second attribute may be called a second area. Hereinafter, the dot area DA may be displayed by changing the color, the density, etc., of the reflecting sheet 126, and areas having the different colors, densities, etc., may be formation areas of dots having different attributes even if a separate explanation is not given. For example, dots having different attributes may be disposed in an area with a first color and an area with a second color. Namely, dots, which are different from one another in at least one of the size, the density, the color, and the interval, may be disposed in different areas.

The reflecting sheet 126 may further include a non-dot area NDA. The non-dot area NDA may be an area, in which there is no dot DT. The non-dot area NDA may be positioned in various areas of the reflecting sheet 126. For example, the non-dot area NDA may include first and second non-dot areas NDA1 and NDA2.

A width of the non-dot area NDA may be greater than a distance between adjacent dots. Namely, the width of the non-dot area NDA in a direction from the first sheet area 126a to the third sheet area 126c may be greater than a distance between two dots adjacent to the non-dot area NDA. The width of the non-dot area NDA may be equal to or greater than 2 mm.

The second non-dot area NDA2 may be positioned at a boundary between the second sheet area 126b and the third sheet area 126c. The second non-dot area NDA2 may be positioned in the second sheet area 126b at the boundary between the second sheet area 126b and the third sheet area 126c.

The second non-dot area NDA2 may be an uppermost area of the second sheet area 126b and thus may be close to the optical sheet 125 and/or the diffusion plate 129 positioned in front of the reflecting sheet 126. Hence, if the dot DT exists in the second non-dot area NDA2, the user of the display device 100 may observe the dot DT. Thus, the dot DT may not exist in the second non-dot area NDA2.

FIGS. 14 to 23 illustrate a dot distribution of the reflecting sheet according to the embodiment of the invention.

As shown in FIGS. 14 to 23, the dots DT of the reflecting sheet 126 according to the embodiment of the invention may be disposed in various shapes.

Figure 14:
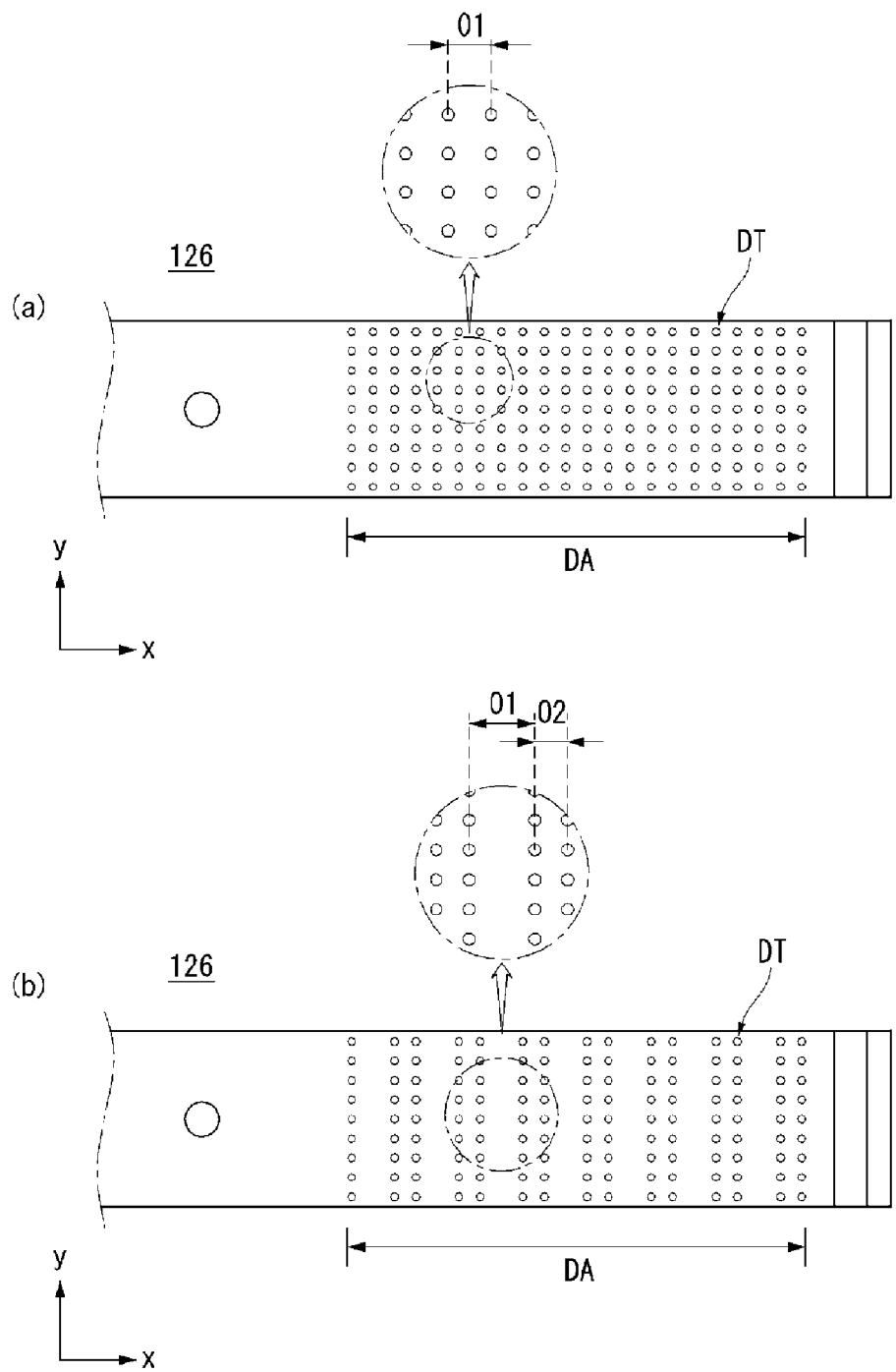
FIGS. 14 to 17 illustrate a dot distribution of a reflecting sheet according to an example embodiment of the invention.

As shown in (a) of FIG. 14, the dots DT may be disposed in the dot area DA. The adjacent dots DT may be separated from each other by a first distance O1. Namely, the dots DT may be disposed at regular intervals of the first distance O1.

The distance between the dots DT may affect the reflectance of the reflecting sheet 126. For example, when the distance between the dots DT decreases, the reflectance may decrease.

As shown in (b) of FIG. 14, the adjacent dots DT may be separated from each other by the first distance O1, and the adjacent dots DT may be separated from each other by a second distance O2. Namely, a distance between the dots DT may not be uniform.

Figure 15:
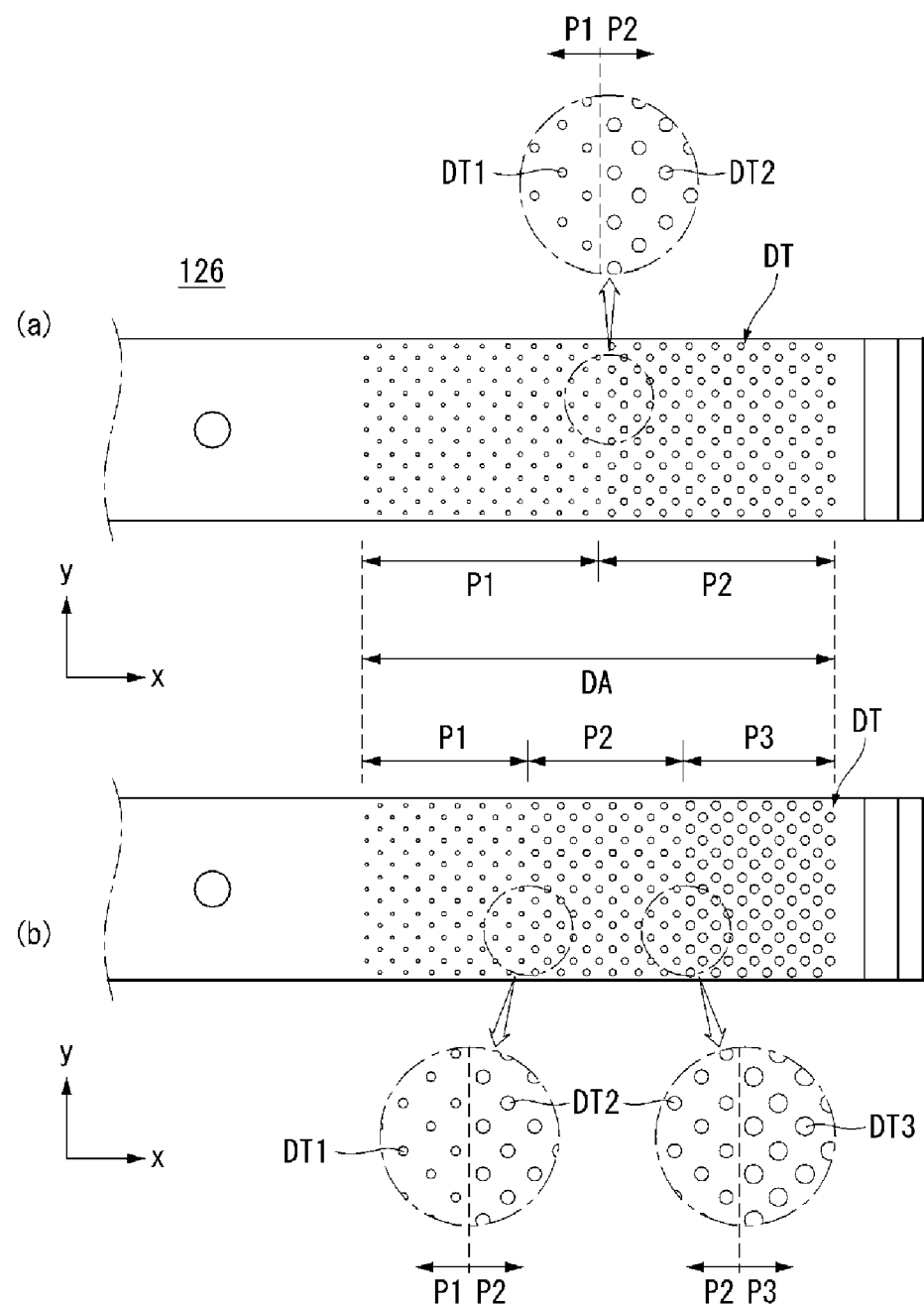

As shown in (a) of FIG. 15, the dot area DA may be divided into a plurality of areas. For example, the dot area DA may be divided into a first area P1 and a second area P2.

An attribute of dots DT included in the first area P1 may be different from an attribute of dots DT included in the second area P2. For example, at least one of a size, a density, and a color of a first dot DT1 in the first area P1 may be different from at least one of a size, a density, and a color of a second dot DT2 in the second area P2.

The second area P2 may be positioned further outside than the first area P1. Namely, the second area P2 may be an area close to the third sheet area 126c. The second dot DT2 of the second area P2 may be larger than the first dot DT1 of the first area P1. Thus, a reflectance of the second area P2 may be less than a reflectance of the first area P1.

As shown in (b) of FIG. 15, the dot area DA may be divided into a plurality of areas. For example, the dot area DA may be divided into first to third areas P1 to P3. First to third dots DP1 to DP3 of the first to third areas P1 to P3 may have different attributes. For example, the second dot DT2 may be larger than the first dot DT1, and the third dot DT3 may be larger than the second dot DT2. Alternatively, the first to third dots DP1 to DP3 have the same size, but a density of the first area P1 may be different from a density of the second area P2, and a density of the second area P2 may be different from a density of the third area P3. For example, the density of the first area P1 may be less than the density of the second area P2, and the density of the second area P2 may be less than the density of the third area P3.

Figure 16:
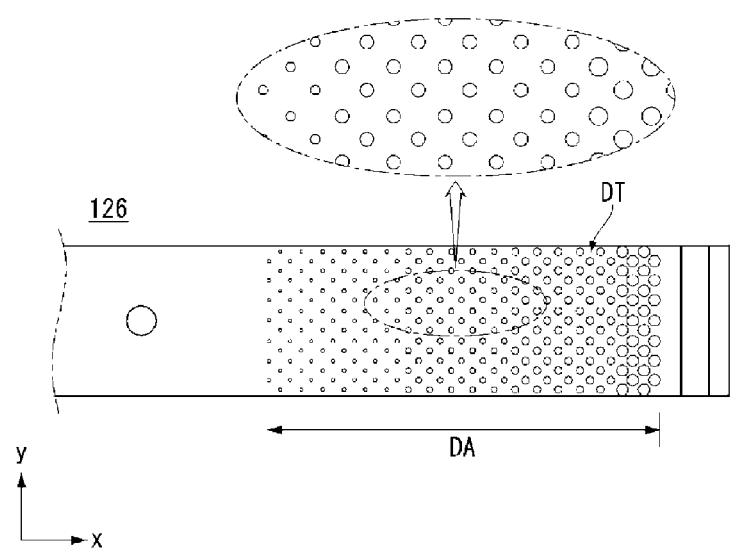

As shown in FIG. 16, the dot area DA may not be divided into a plurality of areas. However, dots DT included in the dot area DA may be different from each other in at least one of a size, a density, and a color. For example, as the dot DT goes along the X-axis direction, the size of the dot DT may gradually increase. Namely, an attribute of the dot DT including at least one of the size, the density, and the color may gradually change.

Figure 17:
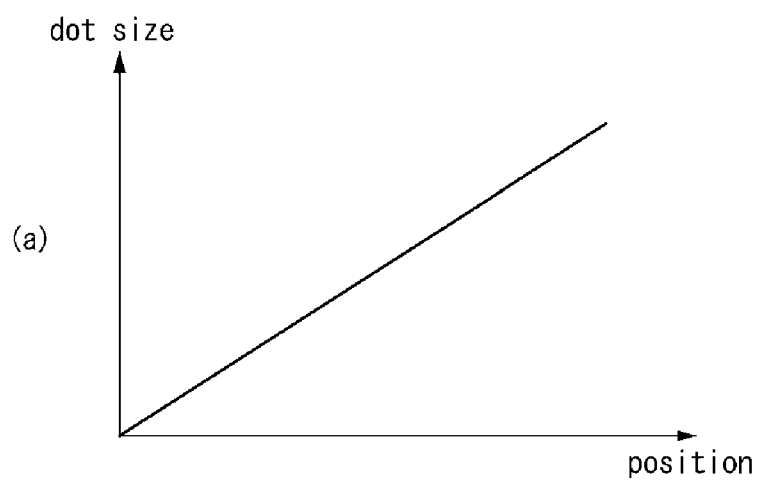
Figure 17:
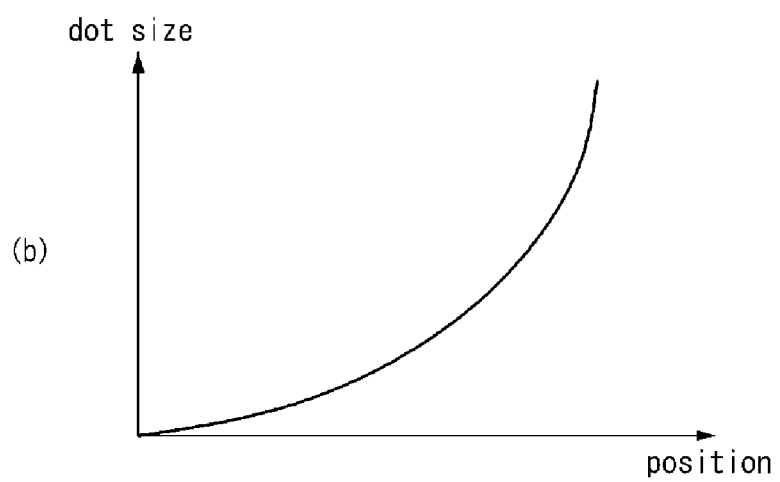

As shown in (a) of FIG. 17, a size of the dot DT may gradually change depending on a location.

As shown in (b) of FIG. 17, a size of the dot DT may sharply change depending on a location. For example, the size of the dot DT may be changed in a curve shape of a quadratic function.

Figure 18:
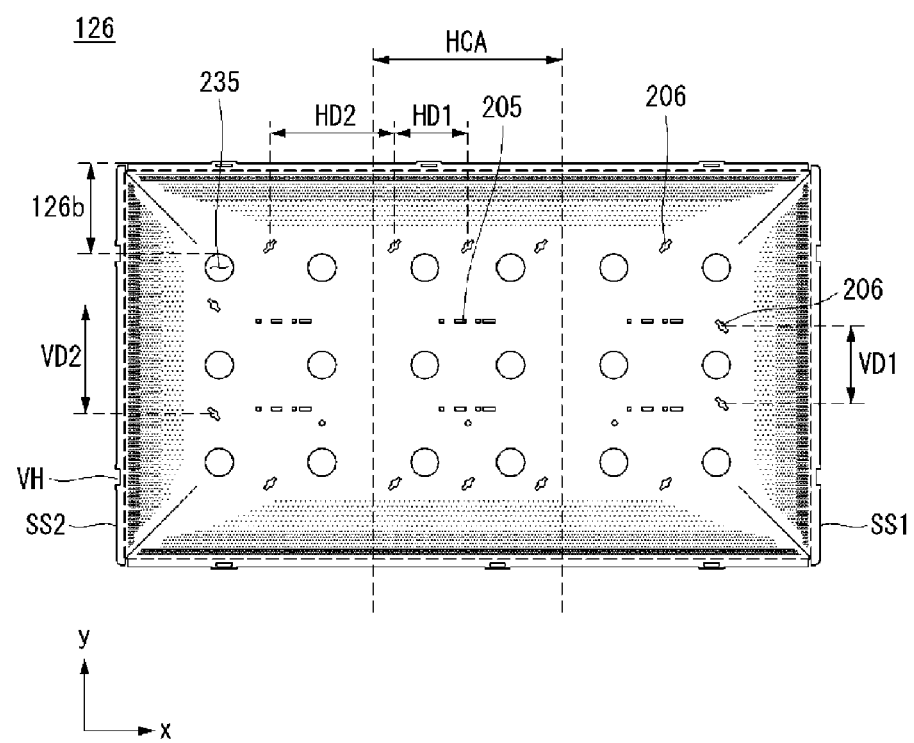
FIGS. 18 and 19 illustrate a reflecting sheet according to an example embodiment of the invention.
Figure 19:
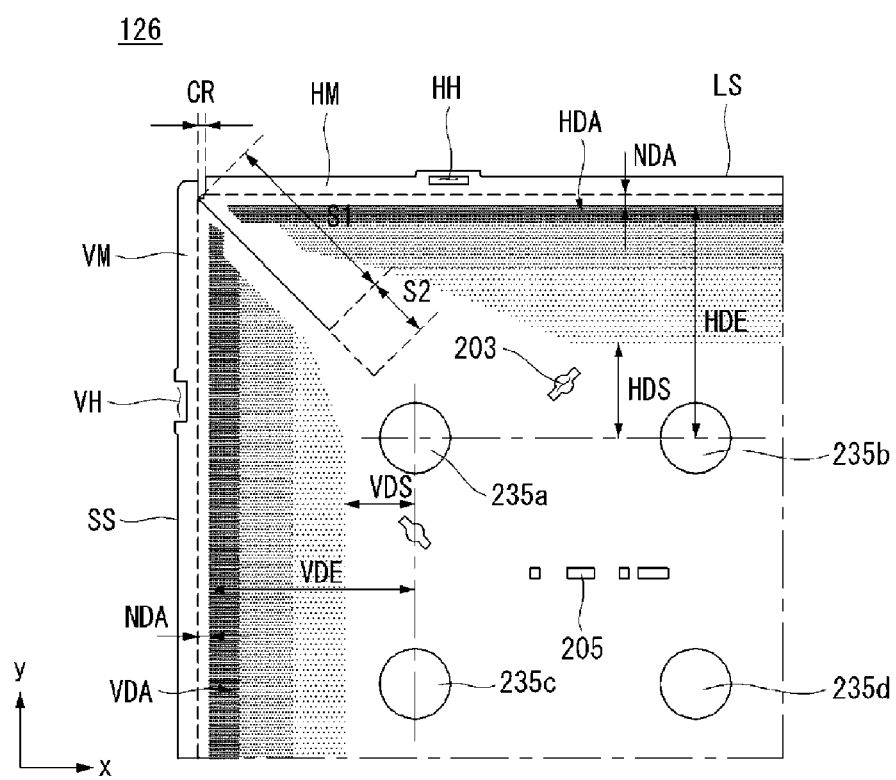

FIGS. 18 and 19 illustrate a reflecting sheet according to an example embodiment of the invention.

As shown in FIGS. 18 and 19, the reflecting sheet 126 according to the embodiment of the invention may include the dot area DA.

The dot area DA may be formed along the long side and/or the short side of the reflecting sheet 126. Namely, the dot area DA may be formed in the corner area of the reflecting sheet 126. In other words, the dot area DA may be formed in the second sheet area 126b (refer to FIG. 11) of the reflecting sheet 126 placed in the receiving unit 132 (refer to FIG. 10) of the frame 130 (refer to FIG. 10).

The dot area DA may include first and second horizontal dot areas HDA1 and HDA2 and first and second vertical dot areas VDA1 and VDA2. The first and second horizontal dot areas HDA1 and HDA2 are represented as the horizontal dot area HDA, and the first and second vertical dot areas VDA1 and VDA2 are represented as the vertical dot area VDA, except in the instance where they need to be distinguished from each other.

A shape of the horizontal dot area HDA may be different from a shape of the vertical dot area VDA. For example, the shape of the horizontal dot area HDA may not be symmetric to the shape of the vertical dot area VDA based on a cutting portion S1 positioned at the corner of the reflecting sheet 126.

The reflecting sheet 126 may include lens holes 235 for coupling the lenses 124b (refer to FIG. 11), fixing pin holes 206, supporter holes 205, a horizontal coupling unit HH, and a vertical coupling unit VH.

The lens holes 235 may be disposed in parallel with one another along the horizontal and vertical directions based on the size of the display device 100.

The fixing pin hole 206 may be coupled to the fixing pin 202 (refer to FIG. 10) for fixing the reflecting sheet 126 to the frame 130 (refer to FIG. 10). The fixing pin hole 206 may be positioned adjacent to the outermost lens hole 235. For example, the fixing pin hole 206 may be positioned between the adjacent lens holes 235 or between the lens hole 235 and the dot area DA.

The fixing pin hole 206 may be positioned adjacent to the lens hole 235 disposed on the outermost side. For example, the fixing pin hole 206 may be positioned closer to the outermost side than the outermost lens hole 235. For example, the fixing pin hole 206 may be positioned at a location overlapping the outermost lens hole 235.

When the fixing pin 202 (refer to FIG. 10) is coupled to the frame 130 (refer to FIG. 10) through the fixing pin hole 206, the second sheet area 126b may be naturally formed. Namely, when the fixing pin 202 (refer to FIG. 10) is coupled to the frame 130 (refer to FIG. 10) through the fixing pin hole 206 formed in the horizontal and vertical directions, a round chamfer may be formed in the outer area of the reflecting sheet 126.

A distance between the fixing pin holes 206 may be differently set. For example, a number of fixing pin holes 206 positioned in a horizontal center area HCA may be more than a number of fixing pin holes 206 positioned in other areas based on the horizontal direction of the reflecting sheet 126.

A distance between the fixing pin holes 206 positioned in the horizontal center area HCA may be called a first horizontal distance HD1, and a distance between the fixing pin holes 206 positioned in areas other than the horizontal center area HCA may be called a second horizontal distance HD2. The first horizontal distance HD1 may be less than the second horizontal distance HD2. Namely, the fixing pin holes 206 in the horizontal center area HCA may be more densely disposed. Thus, a round chamfer may be naturally formed at the four upper, lower, left, and right corners of the reflecting sheet 126 while the reflecting sheet 126 is efficiently fixed.

The fixing pin holes 206 disposed in the vertical direction may exist. For example, the fixing pin holes 206 may be disposed along the left and right short sides of the reflecting sheet 126.

The fixing pin holes 206 on the first short side SS1 may be disposed at predetermined intervals of a first vertical distance VD1. The fixing pin holes 206 on the second short side SS2 may be disposed at predetermined intervals of a second vertical distance VD2. The first vertical distance VD1 and the second vertical distance VD2 may be different from each other. The second vertical distance VD2 may be greater than the first vertical distance VD1.

A difference between the first vertical distance VD1 and the second vertical distance VD2 may be generated by a shape of the frame 130 coupled to the reflecting sheet 126. For example, the difference between the first vertical distance VD1 and the second vertical distance VD2 may be generated by a coupling space of a rib for assisting rigidity of the frame 130 and/or various electronic parts coupled to the frame 130. The supporter holes 205 may be coupled to the supporters 200. The supporter holes 205 may support the diffusion plate 129 (refer to FIG. 5) and/or the optical sheet 125 (refer to FIG. 5) on the reflecting sheet 126. The supporter holes 205 may be positioned in the middle of the reflecting sheet 126 for the efficient support. Namely, the supporter hole 205 may be positioned further inside than the outermost lens hole 235.

The horizontal coupling unit HH and the vertical coupling unit VH may be disposed along the corner area of the reflecting sheet 126. The horizontal coupling unit HH and the vertical coupling unit VH may be inserted into the protrusions of the frame 130 (refer to FIG. 10).

FIG. 19 shows one edge area of the reflecting sheet 126.

Outermost lens holes 235a to 235c may mean the lens hole 235 positioned on the outermost side. Among the outermost lens holes 235a to 235c, the first and second outermost lens holes 235a and 235b positioned on the upper side may be separated from the lower side of the horizontal dot area HDA by a first distance HDS and may be separated from the upper side of the horizontal dot area HDA by a second distance HDE. Among the outermost lens holes 235a to 235c, the first and third lens holes 235a and 235c positioned on the side may be separated from the lower side of the vertical dot area VDA by a third distance VDS and may be separated from the upper side of the vertical dot area VDA by a fourth distance VDE.

The first distance HDS may be different from the third distance VDS, and the second distance HDE may be different from the fourth distance VDE. This means that a width, a length, etc., of the horizontal dot area HDA may be different from a width, a length, etc., of the vertical dot area VDA.

The first distance HDS may be greater than the third distance VDS. Namely, a distance between the horizontal dot area HDA and the lens hole 235 is greater than a distance between the vertical dot area VDA and the lens hole 235.

The second sheet area 126b (refer to FIG. 11) corresponding to the horizontal dot area HDA may be shorter than the second sheet area 126b (refer to FIG. 11) corresponding to the vertical dot area VDA. Because lengths of the long side and the short side of the second sheet area 126b are different from each other, a slope of the round chamfer of the vertical dot area VDA on the short side may be greater than a slope of the round chamfer of the horizontal dot area HDA on the long side. An increase in the slope may increase a reflectance. When the reflectance increases, a corresponding portion may look brighter. In the reflecting sheet 126 according to the embodiment of the invention, because the vertical dot area VDA is positioned closer to the lens hole 235 than the horizontal dot area HDA, the reflectance may be controlled in spite of the high slope of the vertical dot area VDA on the short side of the reflecting sheet 126.

The non-dot area NDA may be positioned between the horizontal/vertical dot area HDA or VDA and a horizontal/vertical margin area HM or VM. Namely, the non-dot area NDA not including the dot DT may be positioned on the horizontal/vertical dot area HDA or VDA, so that the user watching the display device 100 cannot recognize the dots DT. The non-dot area NDA is formed considering that the dots DT may be recognized from the outside when the dots DT exist in a corresponding area.

The horizontal and vertical margin areas HM and VM may correspond to the third sheet area 126c. Namely, the horizontal and vertical margin areas HM and VM may be an outermost area of the reflecting sheet 126. In other words, the horizontal and vertical margin areas HM and VM may be an area of the reflecting sheet 126 contacting the third frame area 130c of the frame 130 (refer to FIG. 11). The dots DT may not exist in the horizontal/vertical margin area HM or VM.

A gap CR may exist between the horizontal margin area HM and the vertical margin area VM. The reflecting sheet 126 may be a plane. Namely, the reflecting sheet 126 may be a two-dimensional plane. When the reflecting sheet 126 of the two-dimensional shape is coupled to the receiving unit 132 (refer to FIG. 10) of the three-dimensional shape, the reflecting sheet 126 may be changed into the three-dimensional shape. The shape of the reflecting sheet 126 may be changed by overlapping at least a portion of the reflecting sheet 126 along the cutting portion S1. A shadow may be generated by the overlap of the reflecting sheet 126. The gap CR may prevent the overlap of the reflecting sheet 126 and thus suppress the generation of the shadow.

A folded portion S2 may extend from an end of the cutting portion S1. The folded portion S2 may not be cut, unlike the cutting portion S1. The folded portion S2 may be formed by previously folding a corresponding area along the cutting portion S1. Thus, when the reflecting sheet 126 is changed into the three-dimensional shape in the receiving unit 132 (refer to FIG. 10), the reflecting sheet 126 may be guided by the folded portion S2 and may be changed into a previously designed shape.

Figure 20:
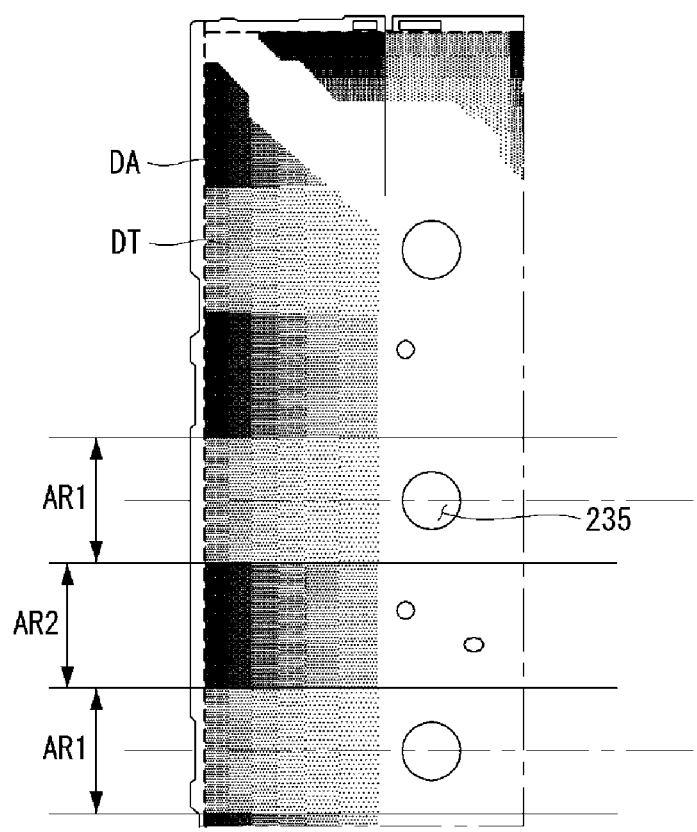
FIG. 20 illustrates a dot distribution of a reflecting sheet according to an example embodiment of the invention.

FIG. 20 illustrates a dot distribution of a reflecting sheet according to an example embodiment of the invention.

As shown in FIG. 20, the dot area DA may exist on the reflecting sheet 126. For example, the dots may be distributed along the short sides of the display device 100. For example, the dots may be distributed in the second area 126b (refer to FIG. 13) of the reflecting sheet 126. As described above, the dot area DA may include a horizontal dot area HDA and a vertical dot area VDA. A description of one of the horizontal dot area HDA and the vertical dot area VDA is equally applied to the other, except in the instance where the horizontal dot area HDA and the vertical dot area VDA are separately described.

The arrangement of the dots DT in the dot area DA may be related to the arrangement of the lens holes 235. As described above, the lens hole 235 may correspond to the light source 203 (refer to FIG. 10) and the lens 124b (refer to FIG. 10).

The plurality of lens holes 235 may be disposed on the reflecting sheet 126 in accordance with a predetermined rule. Some of the plurality of lens holes 235 may be disposed adjacent to the dot area DA. For example, the lens holes 235 may be separated from the dot area DA by a predetermined distance and may be disposed in parallel with each other.

A first area AR1 and a second area AR2 may be formed based on the lens holes 235. For example, the first area AR1 may correspond to an outmost hole among the lens hole 235, and the second area AR2 may be positioned between the first areas AR1. For example, the first area AR1 may be an area including the lens hole 235, and the second area AR2 may be an area between the lens holes 235.

The dots DT disposed in the first area AR1 and the second area AR2 may have different attributes. For example, a pattern of the dot included in the first area AR1 may be different from a pattern of the dot included in the second area AR2. The pattern of the dot may mean at least one group of a size, a density, a color, and an arrangement of the dots DT. For example, at least one of a size, a density, and a color of the dot DT in the first area AR1 may be different from at least one of a size, a density, and a color of the dot DT in the second area AR2. The difference is because intensities of light beams reaching the first area AR1 and the second area AR2 may be different from each other depending on a distance between the lens hole 235 and the first area AR1 and the second area AR2.

A size of a specific dot included in the first area AR1 may be different from a size of a specific dot included in the second area AR2. The dots of the first and second areas AR1 and AR2 may be different from each other in a location. For example, a size of a first dot included in the first area AR1 may be different from a size of a second dot which is included in the second area AR2 and is closer to the first sheet area 126*a* than the first dot.

Figure 21:
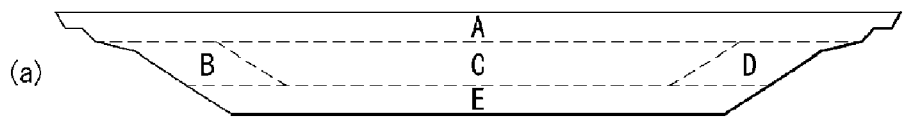
FIGS. 21 and 27 illustrate a dot distribution of a reflecting sheet according to an example embodiment of the invention.
Figure 21:
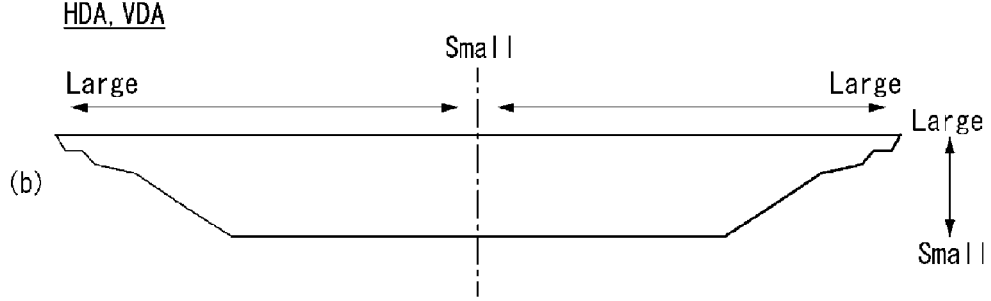
Figure 21:
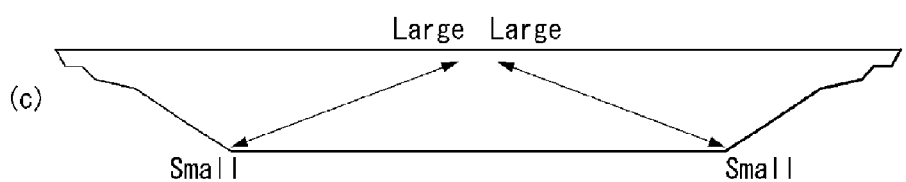
Figure 27:
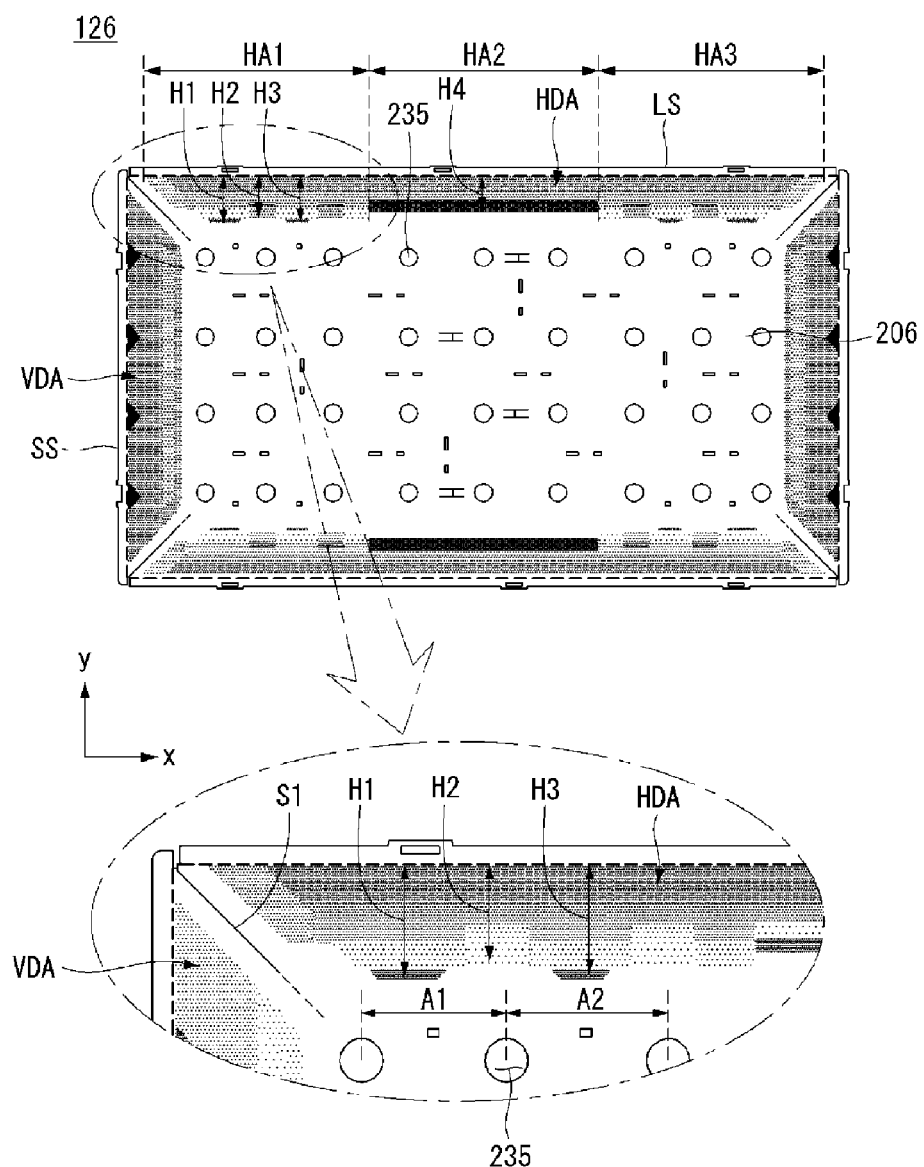

FIGS. 21 and 27 illustrate a dot distribution of a reflecting sheet according to an example embodiment of the invention.

As shown in FIG. 21, dots DT may be disposed in a horizontal dot area HDA and a vertical dot area VDA in various shapes.

The horizontal dot area HDA may be a dot area DA formed on the long side of the reflecting sheet 126, and a vertical dot area VDA may be a dot area DA formed on the short side of the reflecting sheet 126. Detailed locations of the horizontal dot area HDA and the vertical dot area VDA will be described in corresponding paragraphs.

As shown in (a) of FIG. 21, the horizontal dot area HDA and/or the vertical dot area VDA may be divided into a plurality of areas. For example, the horizontal dot area HDA and/or the vertical dot area VDA may be divided into an uppermost area A, a leftmost area B, a rightmost area D, a lowermost area E, and/or a an inner area C. The horizontal dot area HDA and/or the vertical dot area VDA may be divided in different manners.

Dots in the plurality of areas of the horizontal dot area HDA and/or the vertical dot area VDA may have different attributes. For example, a size and/or a density of a dot DT in the uppermost area A may be greater than a size and/or a density of a dot DT in the lowermost area E. A size and/or a density of a dot DT in the inner area C may be greater than a size and/or a density of dots DT in the leftmost area B and the rightmost area D.

As shown in (b) of FIG. 21, the horizontal dot area HDA and/or the vertical dot area VDA may not be divided into a plurality of areas. Namely, the dots DT, of which the attributes gradually change, may be disposed. For example, a size and/or a density of the dot DT may increase as the dot DT goes to the upper side of the horizontal dot area HDA and/or the vertical dot area VDA. The size and/or the density of the dot DT may decrease as the dot DT goes to the inner side of the horizontal dot area HDA and/or the vertical dot area VDA.

As shown in (c) of FIG. 21, attributes of dots DT in an inner area and an outer area of the horizontal dot area HDA and/or the vertical dot area VDA may change. For example, a dot DT having a relatively small size may be disposed at a boundary between the left and right sides and/or the lower side of the horizontal dot area HDA and/or the vertical dot area VDA. A dot DT having a relatively large size may be disposed at a boundary between the inner side and/or the upper side of the horizontal dot area HDA and/or the vertical dot area VDA.

The attribute of the dot DT including the size may change gradually or non-gradually. For example, in an area ranging from the outer area to the inner area of the horizontal dot area HDA and/or the vertical dot area VDA, the size of the dot DT may gradually change or may change depending on a location. For example, the size of the dot DT in a first area including the left and right sides of the horizontal dot area HDA and/or the vertical dot area VDA may be different from the size of the dot DT in a second area including the inner side of the horizontal dot area HDA and/or the vertical dot area VDA. In other words, there may be a difference in at least one of the size, the color, the interval, and the density of the dots DT disposed in a horizontal direction and/or a vertical direction of the horizontal dot area HDA and/or the vertical dot area VDA. For example, in an instance of the horizontal dot area HDA, sizes of two dots DT positioned adjacent to each other in the horizontal direction of the horizontal dot area HDA may be different from each other. The arrangement of the dots DT may be related to the lens hole positioned along the horizontal direction of the horizontal dot area HDA. Namely, a portion, in which the lens hole is positioned, may be brighter, and other areas may be darker. The dots DT having different attributes may be arranged along the horizontal direction of the horizontal dot area HDA, so as to prevent a luminance difference, in which a brighter portion and a darker portion are present.

Figure 22:
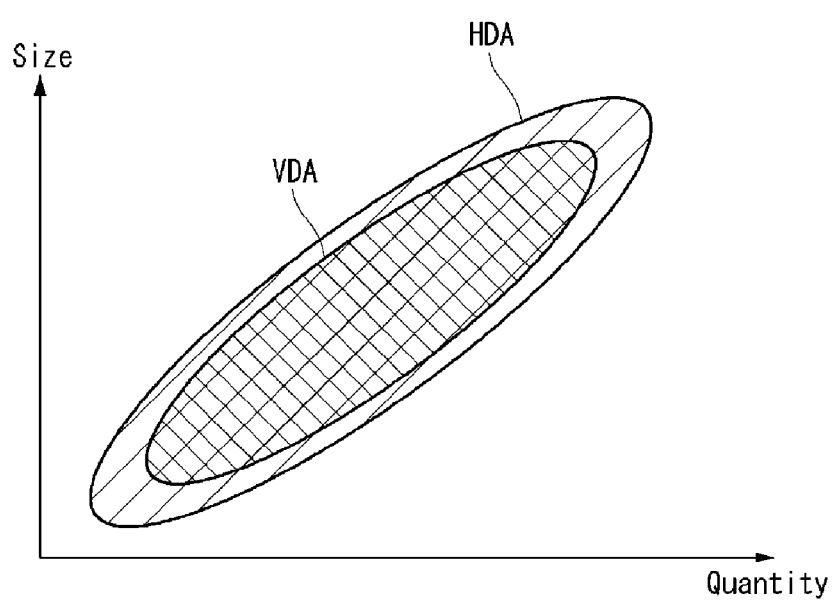

As shown in FIG. 22, dots constituting the horizontal dot area HDA and the vertical dot area VDA may have different attributes. For example, a size range of the dots constituting the horizontal dot area HDA may be greater than a size range of the dots constituting the vertical dot area VDA. Namely, the horizontal dot area HDA may include relatively smaller dots and relatively larger dots than the vertical dot area VDA. In other words, a diversity of the dots constituting the horizontal dot area HDA may be more than a diversity of the dots constituting the vertical dot area VDA. For example, the smallest dot in the horizontal dot area HDA may be smaller than the smallest dot in the vertical dot area VDA, and the largest dot in the horizontal dot area HDA may be larger than the largest dot in the vertical dot area VDA. For example, the smallest dot of the horizontal dot area HDA may have the size equal to or less than 0.5 mm, and the largest dot of the horizontal dot area HDA may have the size equal to or greater than 2 mm. On the other hand, the smallest dot of the vertical dot area VDA may have the size equal to or less than 0.8 mm, and the largest dot of the vertical dot area VDA may have the size equal to or greater than 1.2 mm. For example, when the sizes of the dots included in the horizontal dot area HDA are divided into "A" groups and the sizes of the dots included in the vertical dot area VDA are divided into "B" groups, A is greater than B. In other words, a size diversity of the dots included in the horizontal dot area HDA may be more than a size diversity of the dots included in the vertical dot area VDA.

An amount range of the dots constituting the horizontal dot area HDA may be greater than an amount range of the dots constituting the vertical dot area VDA. For example, when the dots having the same size are used. a number of dots included in the horizontal dot area HDA may be more or less than a number of dots included in the vertical dot area VDA.

Figure 23:
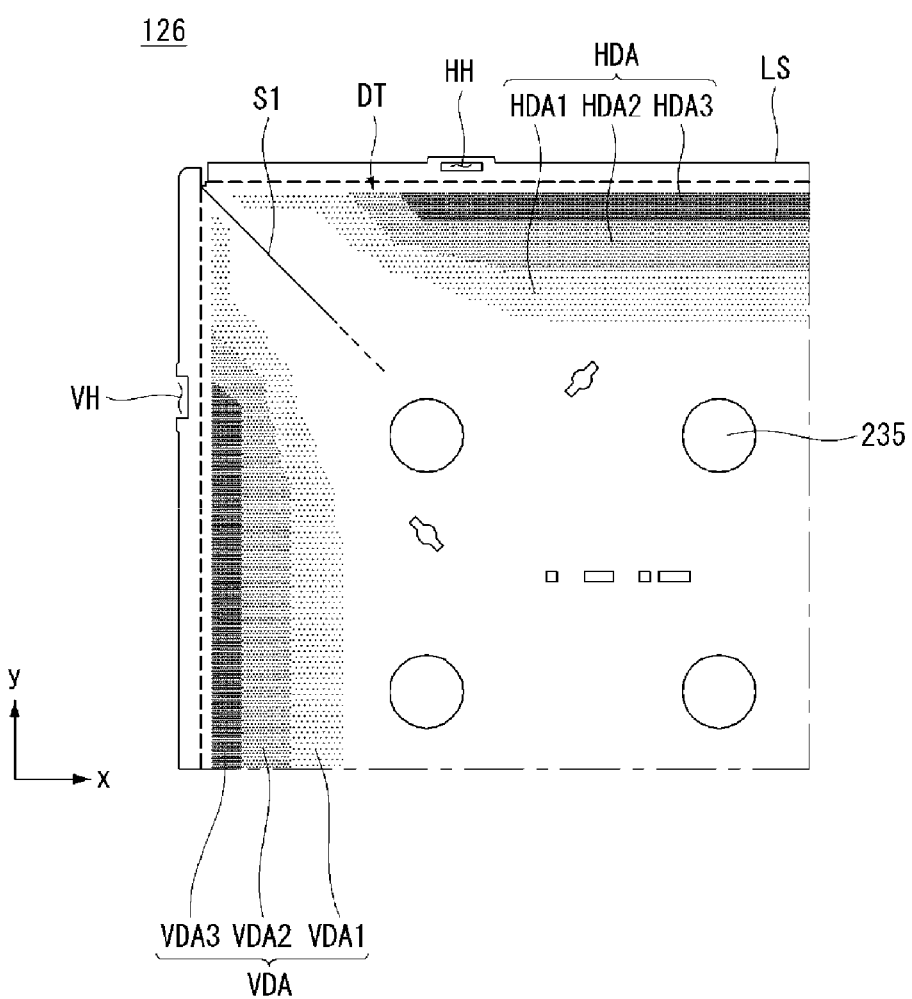

As shown in FIG. 23, attributes of the dots DT constituting the horizontal dot area HDA and/or the vertical dot area VDA may change depending on the area.

The horizontal dot area HDA may include first to third horizontal dot areas HDA1 to HDA3. Namely, the dot area DA may be divided into a plurality of areas. The first horizontal dot area HDA1 may be an area including both sides of the horizontal dot area HDA and may be a boundary area in an inside direction of the reflecting sheet 126. The second horizontal dot area HDA2 may be an area inside the first horizontal dot area HDA1, and the third horizontal dot area HDA3 may be an area inside the second horizontal dot area HDA2.

The dots DT in the first to third horizontal dot areas HDA1 to HDA3 may have different attributes. Namely, there may be a difference between the dots DT of the first to third horizontal dot areas HDA1 to HDA3 in at least one of a size, a density, and a color of the dot DT. For example, the dots DT included in the first horizontal dot area HDA1 may be the same as one another in at least one of the size, the distance, the density, and the color. However, the dot DT of the first horizontal dot area HDA1 may be different from the dot DT of the second horizontal dot area HDA2 in at least one of the size, the distance, the density, and the color. Considering the above description, each of the first to third horizontal dot areas HDA1 to HDA3 may be regarded as the gathering of the dots DT having the same attribute.

The vertical dot area VDA may include first to third vertical dot areas VDA1 to VDA3. The dots DT constituting the first to third vertical dot areas VDA1 to VDA3 may have different attributes. The above description of the first to third horizontal dot areas HDA1 to HDA3 of the horizontal dot area HDA may be equally applied to the first to third vertical dot areas VDA1 to VDA3 of the vertical dot area VDA.

The horizontal dot area HDA and the vertical dot area VDA may be adjacent to four corner areas of the reflecting sheet 126. For example, the horizontal dot area HDA may be disposed on one side of a cutting portion S1, and the vertical dot area VDA may be disposed on the other side of the cutting portion S1. The first horizontal dot area HDA1 and the first vertical dot area VDA1 may be positioned in an area including the corner area close to the horizontal dot area HDA and the vertical dot area VDA Because the corner area is relatively far away from the lens hole 235, the corner area may be relatively dark. Thus, the dot DT may not be disposed in the middle of the corner area. The dots DT having a relatively high reflectance may be disposed in the first horizontal dot area HDA1 and the first vertical dot area VDA1 close to the corner area. For example, the relatively small dots DT may be disposed. For example, the dots DT having the relatively low density may be disposed.

Figure 24:
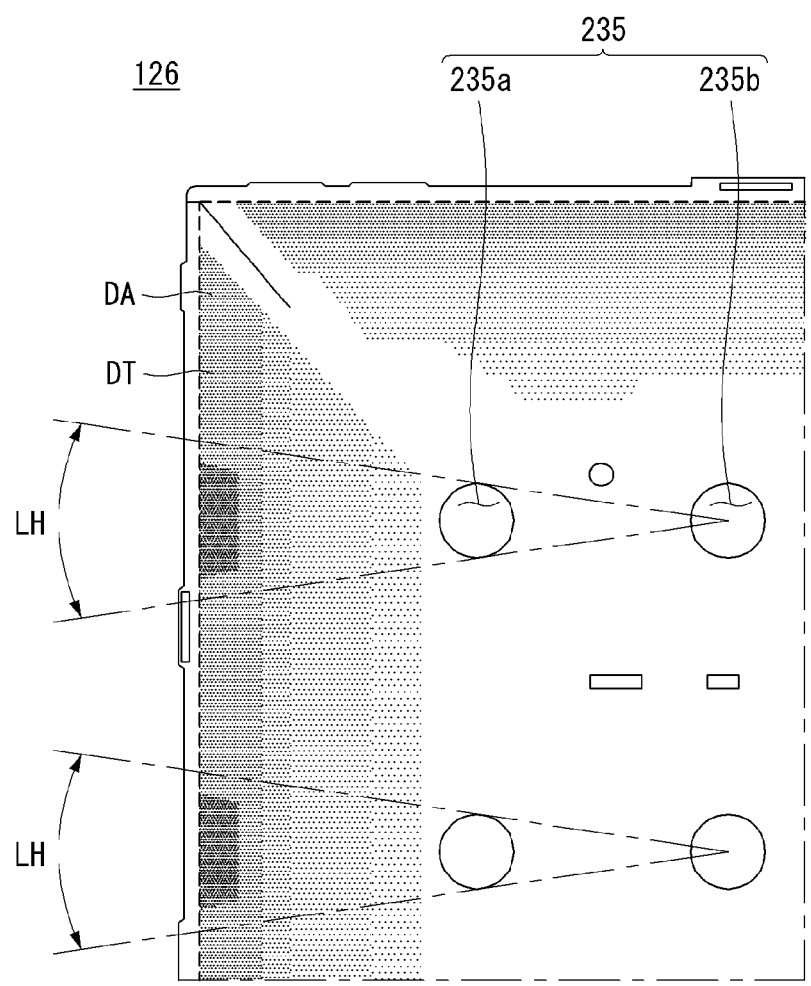

As shown in FIG. 24, the plurality of lens holes 235 may be divided into a first lens hole group 235a and a second lens hole group 235b depending on a distance between the lens holes 235 and the dot area DA. For example, the first lens hole group 235a may include the lens holes 235 adjacent to the dot area DA, and the second lens hole group 235b may include the lens holes 235 in the rear of the first lens hole group 235a.

A portion of light emitted from the second lens hole group 235b may be shielded by the first lens hole group 235a. For example, a shielding area LH may be formed. The brightness of a corresponding area may be less than the brightness of other area because of the shielding area LH. Thus, the dots DT of the shielding area LH and the dots DT of other area may be differently configured. For example, a size of the dot DT in at least a portion of the shielding area LH may be different from that in the other area.

Figure 25:
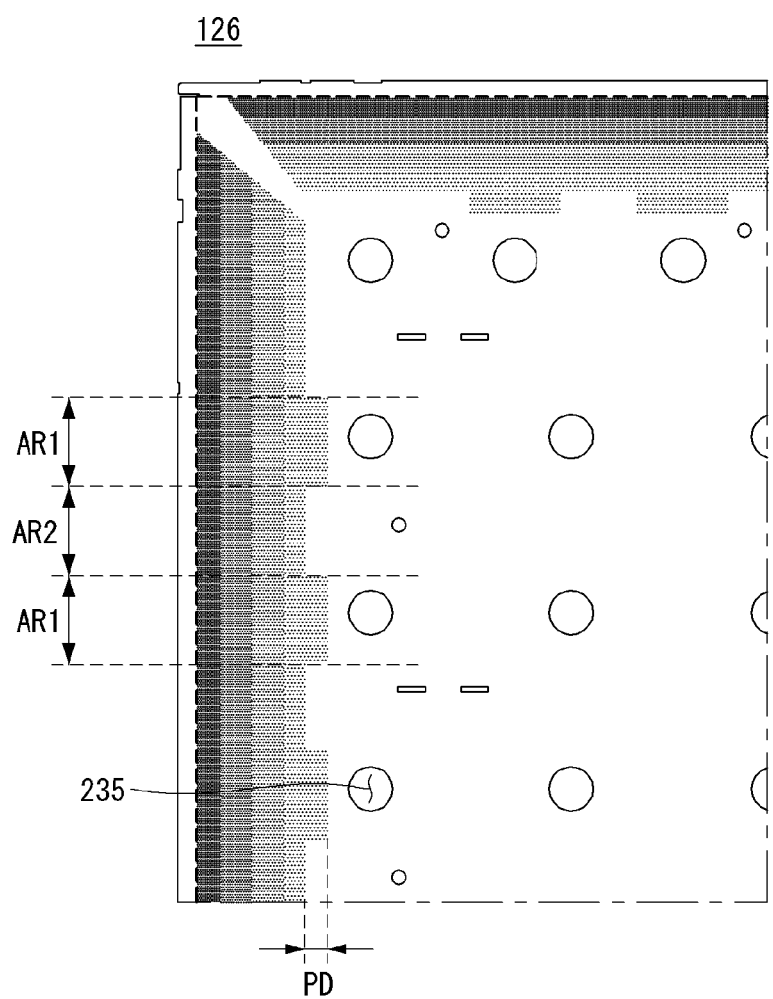

As shown in FIG. 25, a shape of the dot area DA may be changed depending on a location of the lens hole 235. For example, the dot area DA may include a first area AR1 including the lens hole 235 and a second area AR2 except the first area AR1 from the dot area DA. The first area AR1 may protrude to the lens hole 235 further than the second area AR2. For example, a protrusion area PD may be added to the dot area DA. A luminance of an area close to the lens hole 235 may be reduced by the protrusion area PD. The dots DT constituting the protrusion area PD may be different from the dots DT of other area.

The dots DT of the protrusion area PD may be different from other areas dots. In other words, although the protrusion area PD is included in the first area AR1, a size of a dot included in the protrusion area PD may be different from the size of the dot included in the first area AR1. For example, it is possible that a size and/or a density can be larger in the dots of the protrusion area PD. The reflection can be controlled by changing an attribute of the dot in the protrusion area PD.

Figure 26:
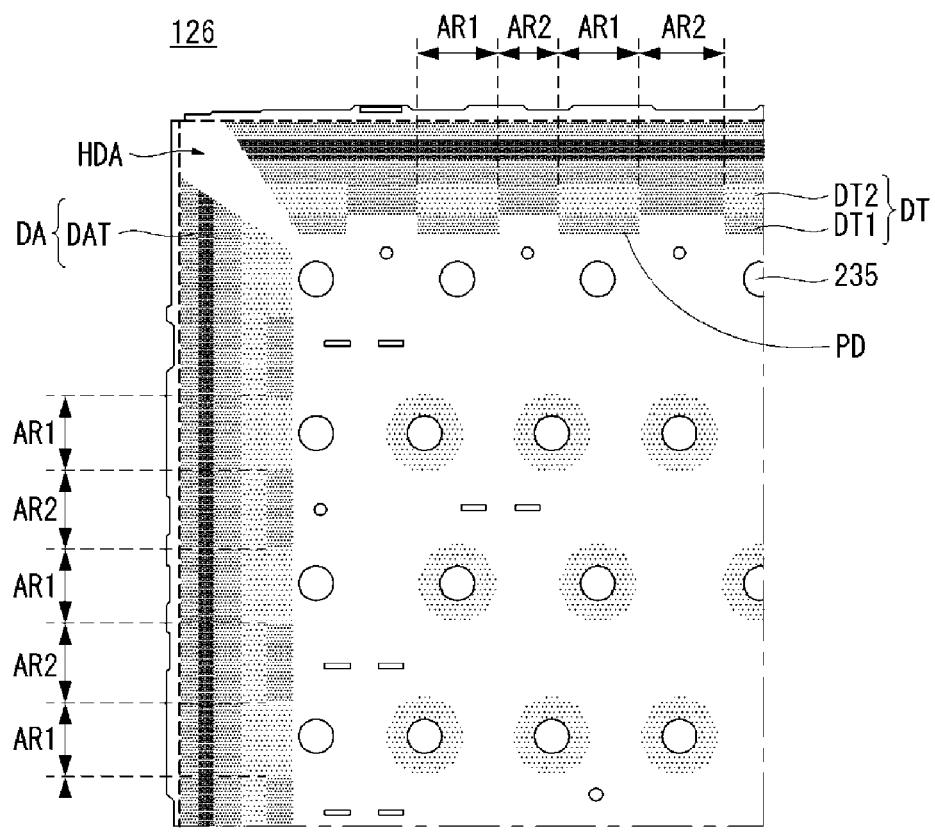

As shown in FIG. 26, the shape of the dot area DA may be changed depending on a relative location between the dot area DA and the lens hole 235. For example, as described above, the first area AR1 corresponding to the lens hole 235 may include the protrusion area PD protruding to the lens hole 235.

A first dot DT1 constituting the protrusion area PD may be different from a second dot DT2 in the rear of the first dot DT1.

A shape of the horizontal dot area HDA may be different from a shape of the vertical dot area VDA. For example, the protrusion area PD may be included only in one of the horizontal dot area HDA and the vertical dot area VDA. This may be related to the fact that a number of lens holes 235 in the horizontal dot area HDA is more than a number of lens holes 235 in the vertical dot area VDA. An attribute of a dot closest to the first sheet area 126a in the first area AR1 may be different from an attribute of a dot closest to the first sheet area 126a in the second area AR2. In other words, the attribute of the dot positioned on the innermost side in the first area AR1 may be different from the attribute of the dot positioned on the innermost side in the second area AR2. For example, a size of a dot positioned on the innermost side in the first area AR1 of the vertical dot area VDA may be different from a size of a dot positioned on the innermost side in the second area AR2 of the vertical dot area VDA.

As shown in FIG. 27, each of the horizontal dot area HDA and the vertical dot area VDA disposed on the reflecting sheet 126 may have a specific shape. For example, a height and/or a width of the horizontal dot area HDA and/or the vertical dot area VDA may be differently set depending on a location.

The horizontal dot area HDA may be divided. For example, the horizontal dot area HDA may be divided into first to third horizontal areas HA1 to HA3. The second horizontal area HA2 may be a center area of the horizontal dot area HDA. The first and third horizontal areas HA1 and HA3 may correspond to both sides of the second horizontal area HA2.

The first and third horizontal areas HA1 and HA3 may have a shape different from the second horizontal area HA2. For example, the first and third horizontal areas HA1 and HA3 may have a shape protruding to the inside of the reflecting sheet 126 further than the second horizontal area HA2. For example, the second horizontal area HA2 may have a fourth height H4. The fourth height H4 may be less than at least one of first to third heights H1 to H3. The shape difference may be because the first and third horizontal areas HA1 and HA3 are closer to the corner of the reflecting sheet 126 than the second horizontal area HA2. Namely, because the reflecting sheet 126 has the rounded shape in the horizontal and vertical directions at the corner of the reflecting sheet 126, the luminance needs to be more precisely controlled.

In the first and third horizontal areas HA1 and HA3, the horizontal dot area HDA may have the shape protruding in a predetermined pattern along the inside direction of the reflecting sheet 126. For example, the horizontal dot area HDA may have the shape protruding by the first height H1 and the second height H2 and then protruding by the third height H3. The first and third heights H1 and H3 may be greater than the second height H2. The first and third heights H1 and H3 may be different from each other. For example, the first heights H1 may be greater than the third height H3. The horizontal dot area HDA of the first height H1 and the horizontal dot area HDA of the third height H3 may be formed between the lens holes 235. For example, the horizontal dot area HDA of the first and third heights H1 and H3 may be formed in first and second areas A1 and A2 between the lens holes 235. Because light beams emitted from the plurality of lens holes 235 overlap each other through the above-described shape of the horizontal dot area HDA, the brightness of the first and second areas A1 and A2 may be efficiently controlled.

FIG. 27 shows that the horizontal dot area HDA has the first to fourth heights H1 to H4, as an example. The vertical dot area VDA having the height/the width different from the horizontal dot area HDA may be configured, so as to achieve the same or similar configuration and effect.

The embodiments and/or the configurations of the invention may be combined with each other. For example, a configuration "A" described in one embodiment of the invention and the drawings and a configuration "B" described in another embodiment of the invention and the drawings may be combined with each other. Namely, although the combination between the configurations is not directly described, the combination is possible except in the instance where it is described that the combination is impossible. This is certain considering that the embodiment of the invention relates to the display device.

Any reference in this specification to "one embodiment" "an embodiment," "exemplary embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
a frame including a bottom and a sidewall extending from the bottom;
at least one substrate located on the frame, and a plurality of light sources mounted on the at least one substrate; and
a reflecting sheet located on the at least one substrate, wherein the reflecting sheet comprises:
a first sheet part located on the bottom, the first sheet part including a plurality of holes corresponding to the plurality of the light sources; and
a second sheet part extended from the first sheet part, the second sheet part including a horizontal dot area located along a long side of the reflecting sheet and a vertical dot area located along a short side of the reflecting sheet, and at least one of the horizontal dot area and the vertical dot area comprising first areas and second areas,
wherein the first areas correspond to outermost holes among the plurality of holes, and the second areas are located between the first areas,
wherein the first areas and the second areas include a plurality of dot areas,
wherein each of the dot areas includes a plurality of dots with a same size,
wherein a size of dots included in one of the plurality of dot areas is different from a size of dots included in another of the plurality of dot areas in the first area,
wherein a size of dots included in one of the plurality of dot areas is different from a size of dots included in another of the plurality of dot areas in the second area,
wherein the first and second areas comprise first dot areas, the first dot areas are positioned between a first distance and a second distance from a line, the line being an imaginary line connecting the outermost holes along at least one of the long side and the short side of the reflecting sheet, and
wherein a size of dots included in the first dot area of the first area is different from a size of dots included in the first dot area of the second area.

2. The backlight unit of claim 1, wherein the first areas further comprise a protrusion area being closer to the line than the first dot areas.

3. The backlight unit of claim 1, wherein the first and second areas comprise second dot areas positioned between the second distance and a third distance from the line, and
wherein a size of dots included in the second dot area of the first area is different from a size of dots included in the second dot area of the second area.

4. The backlight unit of claim 1, wherein at least one dot closest to the line in the first areas are closer to the line than at least one dot closest to the line in the second areas.

5. The backlight unit of claim 1, wherein the first and second areas comprise second dot areas positioned between the second distance and a third distance from the line, and
wherein the size of dots included in the first dot area of the first area is different from a size of dots included in the second dot area of the first area.

6. The backlight unit of claim 1, wherein the first and second areas comprise second dot areas positioned between the second distance and a third distance from the line, and
wherein the size of dots included in the first dot area of the second area is different from a size of dots included in the second dot area of the second area.

7. The backlight unit of claim 1, wherein the line includes a first line along the long side of the reflecting sheet and a second line along the short side of the reflecting sheet, and
wherein a distance between the first line and a closest dot to the first line on the horizontal dot area is greater than a distance between the second line and a closest dot to the second line on the vertical dot area.

8. The backlight unit of claim 1, wherein dot patterns of the horizontal dot area are different from dot patterns of the vertical dot area.

9. The backlight unit of claim 1, wherein an area of the horizontal dot area is different from an area of the vertical dot area.

10. The backlight unit of claim 1, wherein, in a corner of the reflecting sheet, a shape of the horizontal dot area is asymmetric with a shape of the vertical dot area.

11. The backlight unit of claim 1, wherein the line includes a first line along the long side of the reflecting sheet and a second line along the short side of the reflecting sheet, and
wherein a distance between the first line and a farmost dot in a vertical direction from the first line on the horizontal dot area is different from a distance between the second line and a farmost dot in a horizontal direction from the second line on the vertical dot area.

12. The backlight unit of claim 1, wherein the reflecting sheet further comprises a third sheet part extending from the second sheet part and being located on the sidewall.

13. The backlight unit of claim 12, wherein, in the second sheet part, the size of the dots of the first areas and the second areas increases as the dots approach the third sheet part.

14. The backlight unit of claim 12, wherein the first areas further include a third dot area,
wherein the third dot area is closer to the third sheet part rather than the first dot area, and
wherein a size of dots included in the third dot area is greater than the size of dots included in the first dot area.

15. The backlight unit of claim 14, wherein the size of dots included in the second dot area is greater than the size of dots included in the first dot area.

16. The backlight unit of claim 12, wherein the third sheet part comprises a long third sheet part along the long side of the reflecting sheet and a short third sheet part along the short side of the reflecting sheet,
wherein the line includes a first line along the long side of the reflecting sheet and a second line along the short side of the reflecting sheet, and
wherein a distance between the first line and the long third sheet part is different from a distance between the second line and the short third sheet part.

17. The backlight unit of claim 1, wherein the second sheet part is bent from the first sheet part.

18. The backlight unit of claim 1, wherein the first area and the second area are sequentially positioned.

19. A display device comprising:
a display panel;
a backlight unit positioned on a rear of the display panel; and
a back cover positioned on a rear of the backlight unit, wherein the backlight unit comprises:
a frame including a bottom and a sidewall extending from the bottom;
at least one substrate located on the frame, and a plurality of light sources mounted on the at least one substrate; and
a reflecting sheet located on the at least one substrate, wherein the reflecting sheet comprises:
a first sheet part located on the bottom, the first sheet part including a plurality of holes corresponding to the plurality of the light sources; and
a second sheet part extended from the first sheet part, the second sheet part including a horizontal dot area located along a long side of the reflecting sheet and a vertical dot area located along a short side of the reflecting sheet, and at least one of the horizontal dot area and the vertical dot area comprising first areas and second areas,
wherein the first areas correspond to outermost holes among the plurality of holes, and the second areas are located between the first areas,
wherein the first areas and the second areas include a plurality of dot areas,
wherein each of the dot areas includes a plurality of dots with a same size,
wherein a size of dots included in one of the plurality of dot areas is different from a size of dots included in another of the plurality of dot areas in the first area,
wherein a size of dots included in one of the plurality of dot areas is different from a size of dots included in another of the plurality of dot areas in the second area,
wherein the first and second areas comprise first dot areas, the first dot areas are positioned between a first distance and a second distance from a line, the line being an imaginary line connecting the outermost holes along at least one of the long side and the short side of the reflecting sheet, and
wherein a size of dots included in the first dot area of the first area is different from a size of dots included in the first dot area of the second area.

20. The display device of claim 19, wherein the first areas further comprise a protrusion area being closer to the line than the first dot areas.

21. The display device of claim 19, wherein the first and second areas comprise second dot areas positioned between the second distance and a third distance from the line, and
wherein a size of dots included in the second dot area of the first area is different from a size of dots included in the second dot area of the second area.

22. The display device of claim 19, wherein at least one dot closest to the line in the first areas are closer to the line than at least one dot closest to the line in the second areas.

23. The display device of claim 19, wherein the first and second areas comprise second dot areas positioned between the second distance and a third distance from the line, and
wherein a size of dots included in the first dot area of the first area is different from a size of dots included in the second dot area of the first area.

24. The display device of claim 19, wherein the first and second areas comprise second dot areas positioned between the second distance and a third distance from the line, and
wherein a size of dots included in the first dot area of the second area is different from a size of dots included in the second dot area of the second area.

25. The display device of claim 19, wherein the line includes a first line along the long side of the reflecting sheet and a second line along the short side of the reflecting sheet, and
wherein a distance between the first line and a closest dot to the first line on the horizontal dot area is greater than a distance between the second line and a closest dot to the second line on the vertical dot area.

26. The display device of claim 19, wherein dot patterns of the horizontal dot area are different from dot patterns of the vertical dot area.

27. The display device of claim 19, wherein an area of the horizontal dot area is different from an area of the vertical dot area.

28. The display device of claim 19, wherein, in a corner of the reflecting sheet, a shape of the horizontal dot area is asymmetric with a shape of the vertical dot area.

29. The display device of claim 19, wherein the line includes a first line along the long side of the reflecting sheet and a second line along the short side of the reflecting sheet, and wherein a distance between the first line and a farmost dot in a vertical direction from the first line on the horizontal dot area is different from a distance between the second line and a famiost dot in a horizontal direction from the second line on the vertical dot area.

30. The display device of claim 19, wherein the reflecting sheet further comprises a third sheet part extending from the second sheet part and being located on the sidewall.

31. The display device of claim 30, wherein, in the second sheet part, the size of the dots of the first areas and the second areas increases as the dots approach the third sheet part.

32. The display device of claim 30, wherein the first areas further include a third dot area,
wherein the third dot area is closer to the third sheet part rather than the first dot area, and
wherein a size of dots included in the third dot area is greater than the size of dots included in the first dot area.

33. The display device of claim 32, wherein the size of dots included in the second dot area is greater than the size of dots included in the first dot area.

34. The display device of claim 30, wherein the third sheet part comprises a long third sheet part along the long side of the reflecting sheet and a short third sheet part along the short side of the reflecting sheet, wherein the line includes a first line along the long side of the reflecting sheet and a second line along the short side of the reflecting sheet, and
wherein a distance between the first line and the long third sheet part is different from a distance between the second line and the short third sheet part.

35. The display device of claim 19, wherein the second sheet part is bent from the first sheet part.

36. The display device of claim 19, wherein the first area and the second area are sequentially positioned.

* * * * *